United States Patent
Matsuda et al.

(10) Patent No.: US 6,252,602 B1
(45) Date of Patent: *Jun. 26, 2001

(54) INFORMATION PROCESSING APPARATUS

(75) Inventors: Eichika Matsuda, Yamatotakada; Koichi Harada, Kitakatsuragi-gun, both of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/934,763

(22) Filed: Sep. 22, 1997

(30) Foreign Application Priority Data

Oct. 8, 1996 (JP) .................................................. 8-267551

(51) Int. Cl.$^7$ .................................................. G06T 15/20
(52) U.S. Cl. .................... 345/425; 345/473; 345/474; 345/115; 345/116; 345/901; 345/355; 345/357
(58) Field of Search ............................. 345/1, 156–173, 345/351, 355, 419, 420, 964, 133, 139, 425, 427, 433, 440, 441, 473, 357, 115–121, 901, 474, 960

(56) References Cited

U.S. PATENT DOCUMENTS

| | | | |
|---|---|---|---|
| 4,601,003 | * 7/1986 | Yoneyama et al. | 364/518 |
| 4,870,458 | * 9/1989 | Shibuya et al. | 355/200 |
| 5,199,104 | * 3/1993 | Hirayama | 395/145 |
| 5,406,307 | * 4/1995 | Hirayama et al. | 345/120 |
| 5,414,444 | * 5/1995 | Britz | 348/156 |
| 5,467,102 | * 11/1995 | Kuno et al. | 345/1 |
| 5,467,444 | 11/1995 | Kawamura et al. | |
| 5,583,529 | * 12/1996 | Satou | 345/87 |
| 5,668,570 | * 9/1997 | Ditzik | 345/173 |
| 5,682,511 | * 10/1997 | Sposato et al. | 348/10 |
| 5,701,403 | * 12/1997 | Watanabe et al. | 345/419 |
| 5,703,624 | * 12/1997 | Kruistum | 345/169 |
| 5,784,058 | * 7/1998 | LaStrange et al. | 345/340 |
| 5,808,616 | * 9/1998 | Shimizu | 345/419 |
| 5,844,547 | * 12/1998 | Minakuchi et al. | 345/173 |
| 5,850,206 | * 12/1998 | Kashiwagi | 345/112 |
| 5,854,997 | * 12/1998 | Sukeda et al. | 704/3 |
| 5,900,848 | * 5/1999 | Haneda et al. | 345/1 |

FOREIGN PATENT DOCUMENTS

| | | |
|---|---|---|
| 2 169 779 | 7/1986 | (GB) . |
| 1-234890 | 9/1989 | (JP) . |
| 7-56504 | 3/1995 | (JP) . |
| 7-84741 | 3/1995 | (JP) . |

OTHER PUBLICATIONS

Asteasu, C. et al., "Three–Dimensional World Model Building and Imaging System Based on a Priori Knowledge", Computers in Industry, vol. 24, No. 1, May 1, 1994, pp. 39–54.

* cited by examiner

Primary Examiner—Almis R. Jankus
Assistant Examiner—Henry N. Tran
(74) Attorney, Agent, or Firm—Nixon & Vanderhye P.C.

(57) ABSTRACT

An information processing apparatus in accordance with the present invention includes a main body input and output section, provided to a main body cabinet section, for displaying a plan view of an object; and a lid body input and output section, provided to a lid body, for displaying a front view of the object. The main body cabinet section and the lid body are connected to each other by hinges so as to be opened and closed. A main control section is provided for changing a display state of the object on either the main body input and output section or the lid body input and output section in a predetermined manner, in response to a change in the display state of the object on the other input and output section. Therefore, the information processing apparatus can display the object in a three-dimensional manner in the plan and front views by referring to the display sections of the input and output sections, allowing the user to visually recognize the object with a natural appearance in a three-dimensional manner.

27 Claims, 19 Drawing Sheets

FIG. 5

| FACILITY NUMBER | COLOR NUMBER | | SCALE RATIO (%) | | |
|---|---|---|---|---|---|
| | BASIC COLOR | SPECIFIED COLOR | BASIC SCALE RATIO | FRONT VIEW SCALE RATIO | PLAN VIEW SCALE RATIO |
| 1 | 1 | **** | 100 | ***** | ***** |
| 2 | 1 | **** | 100 | ***** | ***** |
| 3 | 1 | **** | 100 | ***** | ***** |
| 4 | 1 | **** | 100 | ***** | ***** |
| 5 | 1 | **** | 100 | ***** | ***** |
| 6 | 1 | **** | 100 | ***** | ***** |
| 7 | 1 | **** | 100 | ***** | ***** |
| 8 | 1 | **** | 100 | ***** | ***** |

F I G. 6 (a)
| FACILITY NUMBER | DISPLAY STARTING COORDINATES | DISPLAY DATA | SELECTION-RESPONSIVE AREA | SPECIFIED FACILITY NUMBER | | FACILITY |
|---|---|---|---|---|---|---|
| | | | | LEFT | RIGHT | |
| 1 | (***, ***) | ***** | ***** | 8 | 2 | MUSEUM |
| 2 | (***, ***) | ***** | ***** | 1 | 3 | INFORMATION CENTER |
| 3 | (***, ***) | ***** | ***** | 2 | 4 | BUSINESS PLAZA |
| 4 | (***, ***) | ***** | ***** | 3 | 5 | BANK |
| 5 | (***, ***) | ***** | ***** | 4 | 6 | TELEPHONE OFFICE |
| 6 | (***, ***) | ***** | ***** | 5 | 7 | POST OFFICE |
| 7 | (***, ***) | ***** | ***** | 6 | 8 | SHOPPING MALL |
| 8 | (***, ***) | ***** | ***** | 7 | 1 | LIBRARY |
F I G. 6 (b)
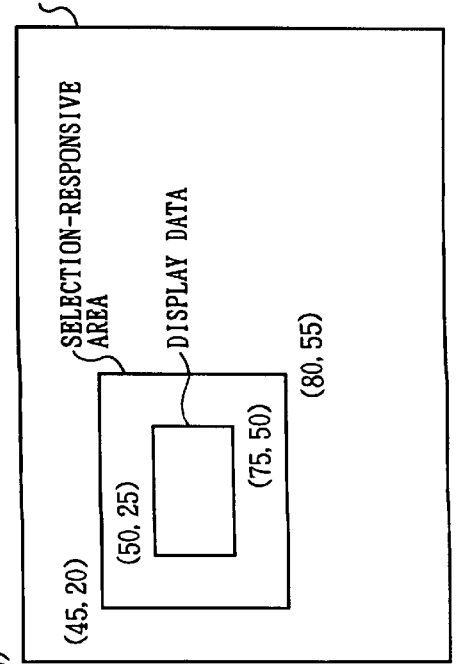
FACILITY NUMBER : 1
DISPLAY STARTING COORDINATES: (50, 25)
DISPLAY DATA: (25, 25), 0x1A, 0x, 55, ......
SELECTION-RESPONSIVE AREA: (45, 20) - (80, 55)

F I G. 7 (a)

| FACILITY NUMBER | SCALE RATIO | | |
|---|---|---|---|
| | 75% (24) | 100% (8) | 150% (3) |
| 1 | DISPLAY DATA, SELECTION-RESPONSIVE AREA | Same as at left | Same as at left |
| 2 | 〃 | 〃 | 〃 |
| 3 | 〃 | 〃 | 〃 |
| ... | ... | ... | ... |
| 7 | 〃 | 〃 | 〃 |
| 8 | 〃 | 〃 | 〃 |

The numbers in parentheses shows how many facilities are displayed.

F I G. 7 (b)

| FACILITY NUMBER | SCALE RATIO | | |
|---|---|---|---|
| | 75% (5) | 100% (3) | 150% (1) |
| 1 | DISPLAY DATA, SELECTION-RESPONSIVE AREA FACILITIES 7, 8 AND 1-3 | Same as at left FACILITIES 8, 1 AND 2 | Same as at left FACILITY 1 |
| 2 | FACILITIES 8, 1 TO 4 | FACILITIES 1, 2 AND 3 | FACILITY 2 |
| 3 | FACILITIES 1 TO 5 | FACILITIES 2, 3 AND 4 | FACILITY 3 |
| ... | ... | ... | ... |
| 7 | FACILITIES 5 TO 8 AND 1 | FACILITIES 6, 7 AND 8 | FACILITY 7 |
| 8 | FACILITIES 6 TO 8, 1 AND 2 | FACILITIES 7, 8 AND 1 | FACILITY 8 |

The numbers in parentheses shows how many facilities are displayed.

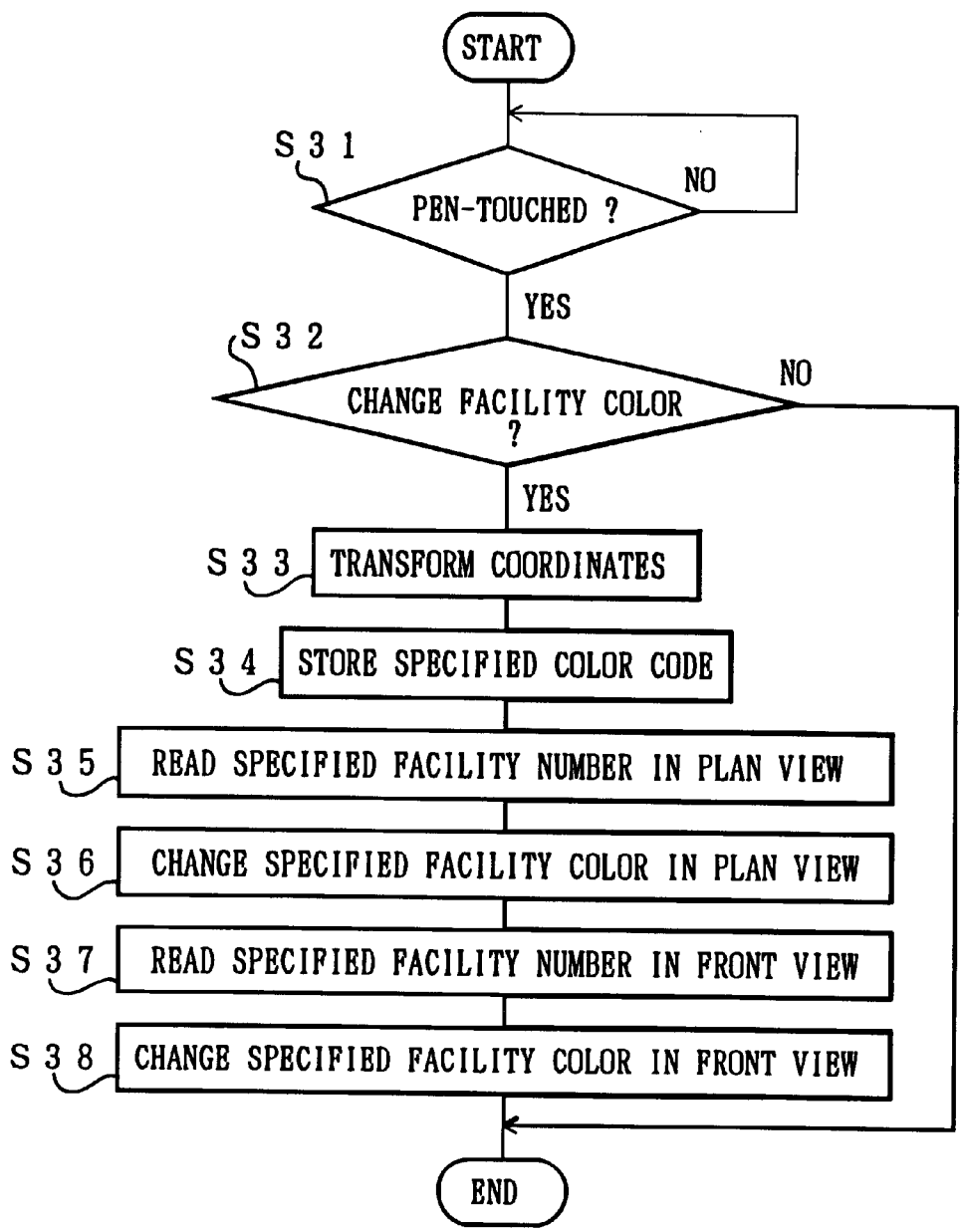

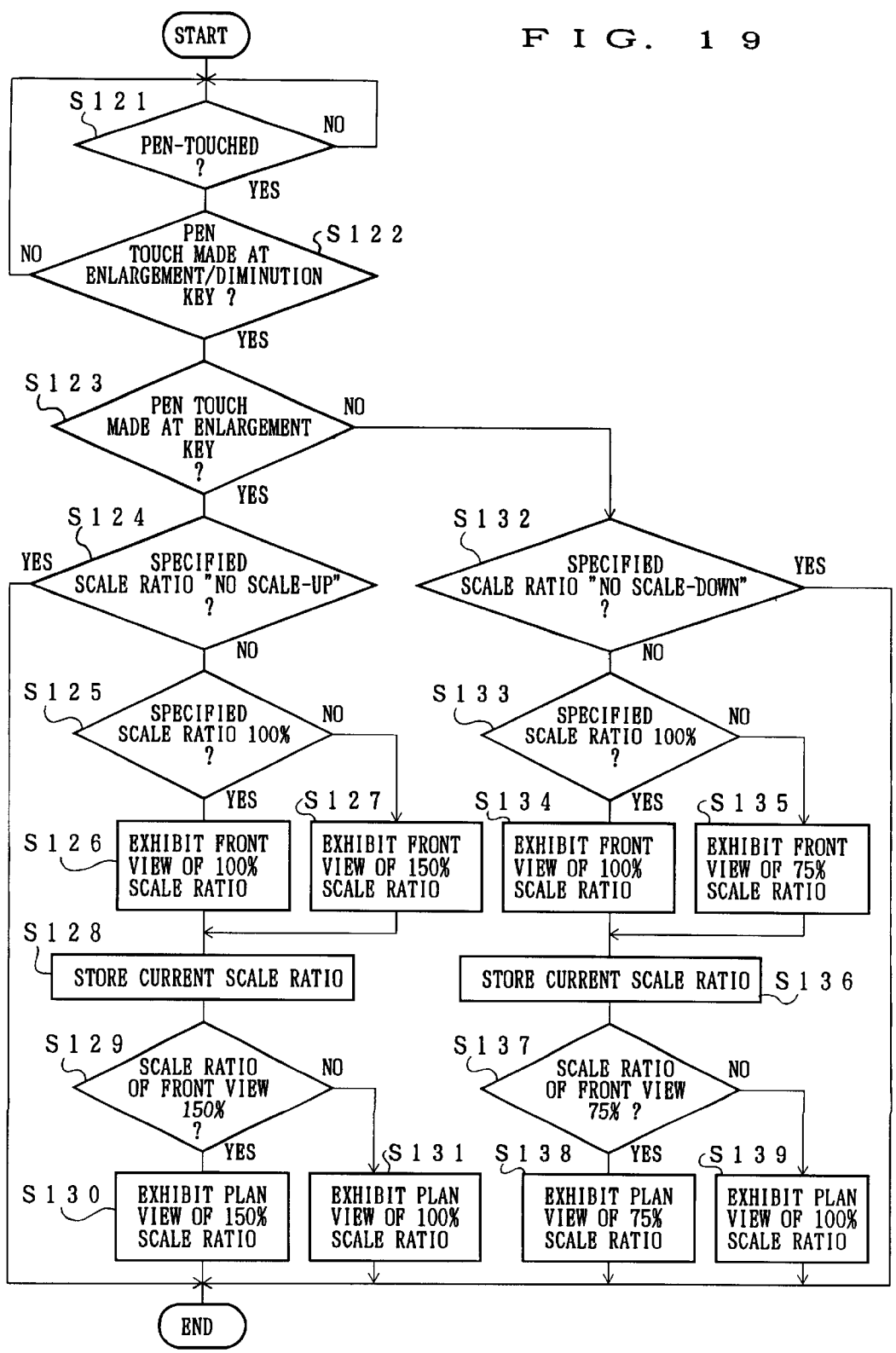

INFORMATION PROCESSING APPARATUS

FIELD OF THE INVENTION

The present invention relates to an information processing apparatus to display information stored in the memory, and more particularly to an information processing apparatus having two display screens.

BACKGROUND OF THE INVENTION

Various information processing apparatuses have been conventionally proposed to improve operability by adopting, for example, a graphic user interface (GUI). Japanese Laid-Open Patent Application No. 7-84741/1995 (Tokukaihei 7-84741), as an example, discloses a technology for graphically structuring the visual interface on a user interface in a data processing system. This conventional technology structures a visual interface on a data processing system by displaying a plurality of graphic user items on the user interface of a data processing system.

Another example is found in Japanese Laid-Open Patent Application No. 1-234890/1989 (Tokukaihei 1-234890) disclosing a graphic display method capable of illustrating objects in three dimensions by displaying three kinds of views, namely the front view, plan view and side view, on a single screen. According to the method, complex graphics can be drawn flexibly in two or more display regions on a single screen without newly defining display regions. To be more specific, a new display region does not overlap an old display region to hide the graphic in the old display region or block the sight when complex graphics are to be drawn in separate display regions.

Japanese Laid-Open Patent Application No. 7-56504/1995 (Tokukaihei 7-56504), as an example, discloses a facility guide map in a multi-storied building. The facility guide map displays, on a single screen, a solid view showing the present location and the destination, a plan view showing the present floor, and a plan view showing the floor on which the destination can be found, and the information displayed includes a way leading from the present location to the destination and landmarks that can be spotted along the way. The facility guide map offers as much information as the operator would need, in a visually easy-to-understand format.

The conventional technologies described above all present information on a single screen, not being directed to a more naturally looking GUI: for example, a three-dimensional GUI such that the operator finds himself/herself in a virtual space.

Some applications having emerged recently on networks such as the Internet realize a GUI that makes the operator feel as if he/she were in the virtual space and that changes the displayed image in response to movement of the operator in the virtual space. However, such applications still provide information only on a single screen, failing to produce three-dimensional graphics with natural appearance.

Some information processing apparatuses have been conventionally suggested for realizing a three-dimensional GUI by displaying images on two screens. An example of such information processing apparatuses exhibits, for example, a front view of an object on one of two display screens and, for example, a plan view of that object on the other display screen. Although such a conventional information processing apparatus displays images on two screens, alteration in the information displayed on one of the screens does not automatically lead to corresponding alteration in the information displayed on the the screen. Therefore, the apparatuses using two screens still have the same problem of lacking in capability to produce three-dimensional graphics with a natural appearance as do the apparatuses using a single screen.

SUMMARY OF THE INVENTION

An object of the present invention is to provide an information processing apparatus that is capable of making a change on one of the display screens in response to a change made on the other display screen and that can thereby display images with a solid natural appearance.

In order to accomplish the object, the information processing apparatus in accordance with the present invention has:
- a first display section including a display screen for displaying a plan view of at least one object;
- a second display section including a display screen for displaying a front view of the object; and
- a main control section for controlling a display state of the object on the display screens of the first and second display sections, and for, in response to a change in the display state of the object on one of the display screens, changing the display state of the object on the other display screen.

The information processing apparatus displays the object in plan and front views on the two display screens provided to the first and second display sections. The information processing apparatus can display one or more objects. When the user changes a display state on, for example, the display screen of the first display section, that is, a display state of the object in the bird's eye view on the display screen of the first display section, the main control section makes, as a response, a predetermined change in the display state on the display screen of the second display section. That is, the display state of the object in the front view on the display screen of the second display section is also changed.

The display state on the display screens is, for example, the size (scale ratio), color, or location of the object on the display screen, or the position of marking upon selection by the user. Those changes in the display state on the display screen of the second display section controlled by the main control section vary greatly from making the same change as on the first display section to enlarging or diminishing, on the display screen of the second display section, the object selected on the display screen of the first display section.

On the other hand, when the user changes a display state on the display screen of the second display section, the main control section makes, as a response, a predetermined change in the display state on the display screen of the first display section.

According to the above configuration, as described above, a display state is changed in a predetermined manner on one of the first and second display sections in response to a change in the display state on the other display section. Therefore, the information processing apparatus can display the object in a three-dimensional manner in the plan and front view with the first and second display sections, allowing the user to visually recognize the object with natural appearance in a three-dimensional manner.

For a fuller understanding of the nature and advantages of the invention, reference should be made to the ensuing detailed description taken in conjunction with the accompanying drawings.

BRIEF DESCRIPTION OF THE DRAWINGS

FIG. 5 is an explanatory drawing showing contents stored in a specified scale ratio memory section and a specified color code memory section incorporated in the information processing apparatus shown in FIG. 1.

FIG. 6(a) is an explanatory drawing showing contents stored in a front view facility display memory section incorporated in the information processing apparatus shown in FIG. 1.

FIG. 6(b) is an explanatory drawing showing an example of display data and a selection-responsive area on the display screens of the main body input and output section and the lid body input and output section.

FIG. 7(a) is an explanatory drawing showing contents stored in a plan view bit map information memory section incorporated in the information processing apparatus shown in FIG. 1.

FIG. 7(b) is an explanatory drawing showing contents stored in a front view bit map information memory section incorporated in the information processing apparatus shown in FIG. 1.

FIG. 11 is a flow diagram showing an operation process, executed by the information processing apparatus shown in FIG. 1, for changing the color of the facility displayed on one of the input and output sections to a predetermined color in response to a change from the color of the facility to the predetermined color on the other input and output section.

FIG. 19 is a flow diagram showing still another operation process, executed by the information processing apparatus shown in FIG. 1, for enlarging or diminishing a plan view displayed on the main body input and output section in response to the enlargement or diminution of the front view displayed on the lid body input and output section.

DESCRIPTION OF THE EMBODIMENTS

[First Embodiment]

The following description will explain an embodiment in accordance with the present invention. The embodiment, however, has a sole purpose of illustrating, not limiting, the present invention.

Figure 2A:
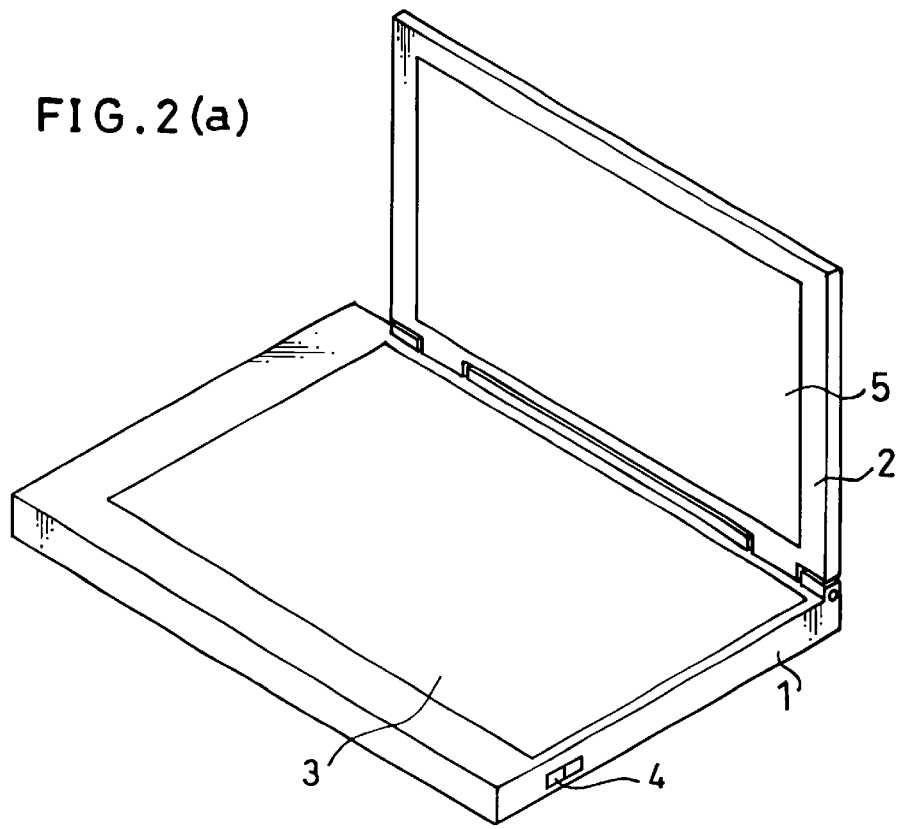
FIG. 2(a) is a perspective view showing the information processing apparatus shown in FIG. 1.
Figure 2B:
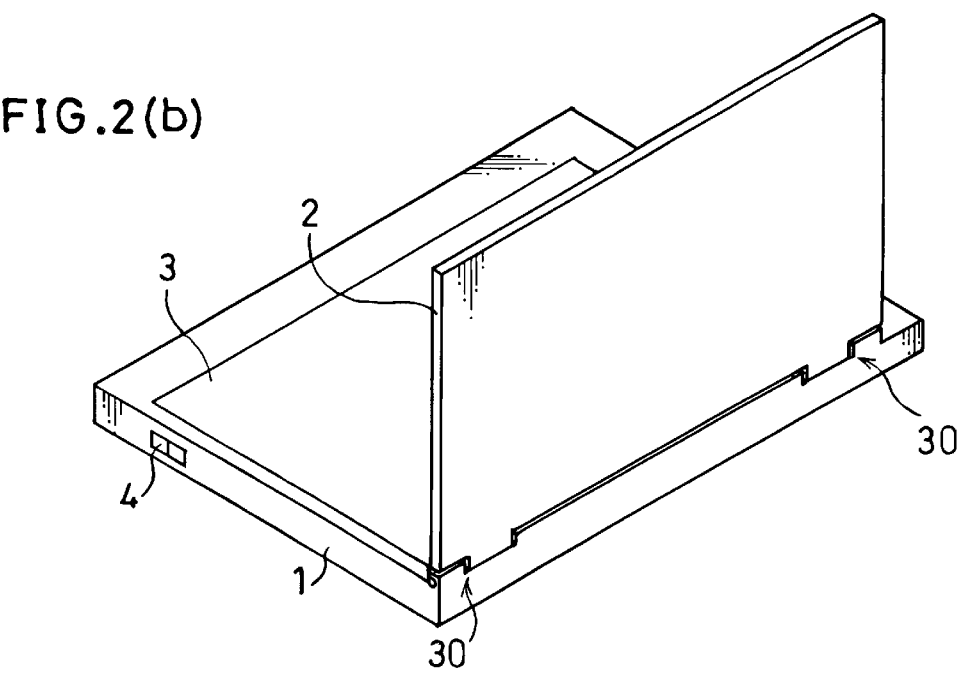
FIG. 2(b) is a perspective view showing, in a different angle, the information processing apparatus shown in FIG. 1.

FIG. 2(a) is a perspective view showing the appearance of an information processing apparatus of the present embodiment. The information processing apparatus includes a main body cabinet section (a main-body-side member and a substrate) 1 and a lid body (an open-close-side member and a substrate) 2 connected to each other by hinges 30 so as to be opened and closed as shown in FIG. 2(b).

The main body cabinet section 1 is includes a main body input and output section (a first display section and an input section) 3, a main body power supply switch 4, an infrared ray communication section, and a pen holder (neither is shown), and incorporates a power source (not shown) for supplying power as necessary to components such as a control circuit for controlling the main body input and output section 3, infrared ray communication section, an interface, etc.

The information processing apparatus utilizes a touch type tablet method, and the user can input predetermined information by pressing a predetermined part on the main body input and output section 3 with, for instance, a finger or a pen. The main body input and output section 3 displays on its display screen, for example, a bird's eye view looking down at facilities (displayed objects, which will be described later in detail), i.e., a plan view of the facilities. Power supply for the information processing apparatus is turned on and off by the main body power supply switch 4.

The lid body 2 includes a lid body input and output section (a second display section and an input section) 5. When the information processing apparatus is carried, the lid body 2 is turned over around the hinges 30 attached to the main body cabinet section 1 to cover the main body input and output section 3, providing protection to the main body input and output section 3 and the lid body input and output section 5. In the same manner as with the main body input and output section 3, the user can input predetermined information by pressing a predetermined part on the lid body input and output section 5 with, for instance, a finger or a pen. The lid body input and output section 5 displays on its display screen, for example, a front view of the facilities.

Although the main body input and output section 3 and the lid body input and output section 5 display the bird's eye view and the front view in the present embodiment respectively, the main body input and output section 3 and the lid body input and output section 5 may be arranged to display the front view and the bird's eye view respectively.

Figure 3:
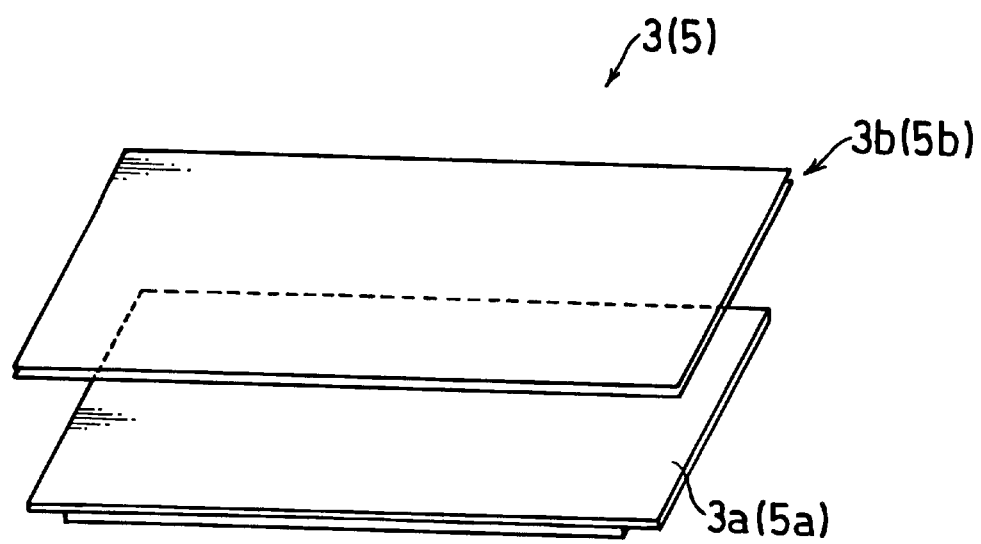
FIG. 3 is a perspective view showing a configuration of a main body input and output section and a lid body input and output section of the information processing apparatus shown in FIG. 1.
Figure 4:
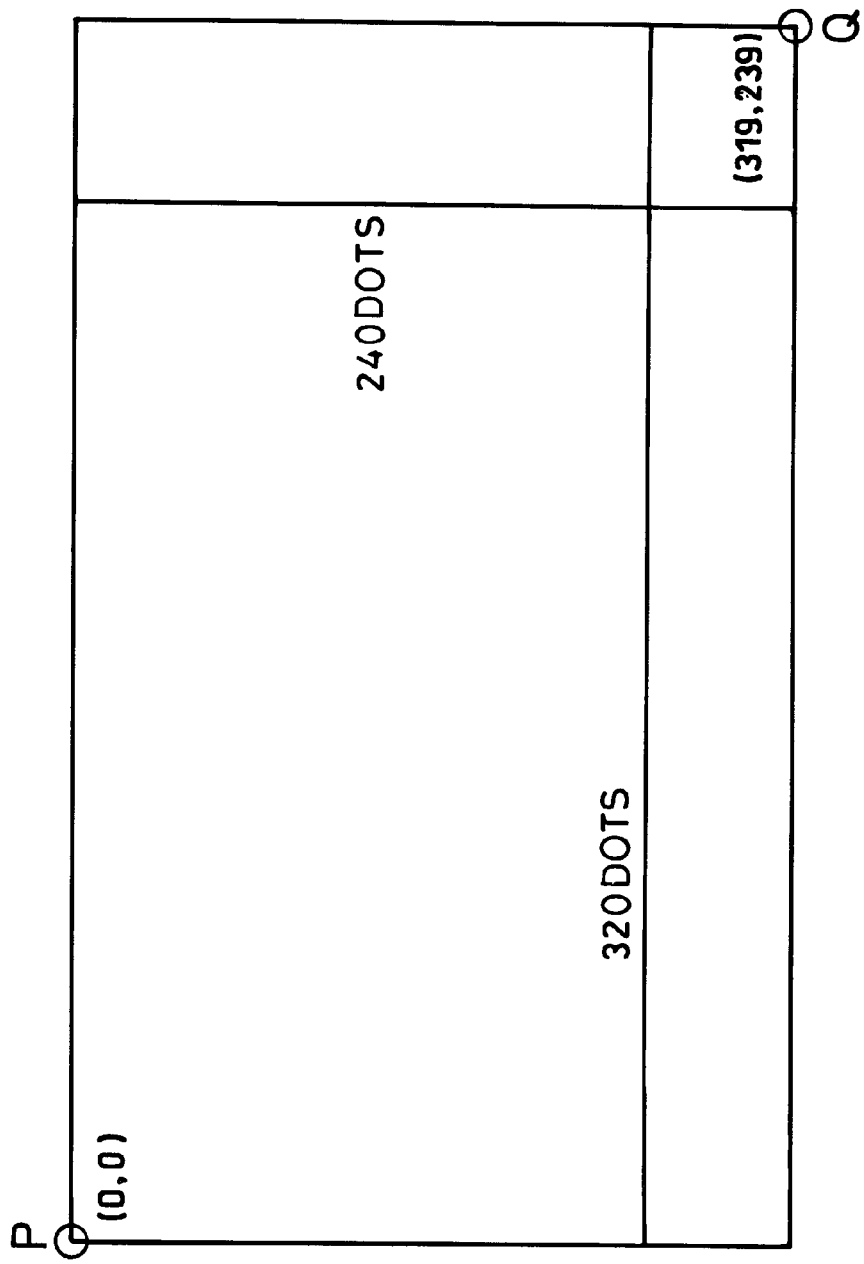
FIG. 4 is an explanatory drawing showing a display region of liquid crystal display sections provided to the main body input and output section and the lid body input and output section shown in FIG. 3.

Now referring to FIGS. 3 and 4, the following description will explain in detail a configuration of the main body input and output section 3 and the lid body input and output section 5.

FIG. 3 is a disassembled perspective view showing the main body input and output section 3 and the lid body input and output section 5 shown in FIG. 2(a). The main body input and output section 3 and the lid body input and output section 5 are provided with respective thin liquid crystal display sections 3a and 5a of a matrix type capable of displaying characters, and transparent tablets 3b and 5b that are integral with and large enough to cover the liquid crystal display sections 3a and 5a.

As shown in FIG. 4, the liquid crystal display sections 3a and 5a each have a display region of 320×240 dots. The dots of the liquid crystal display sections 3a and 5a are lit by the controls of liquid crystal display circuits 3d and 5d (which will be described later in detail with reference to FIG. 1) so as to exhibit visible characters and facilities on the screen. A location on the liquid crystal display sections 3a and 5a is expressed by a coordinate system, with point P on the top left corner as the reference point (0, 0) and the abscissa and ordinate values increasing to the right and downward respectively up to (319, 239).

Each of the transparent tablets 3b and 5b is constituted by, for example, two transparent sheets, transparent electrodes (not shown) provided on the inner side of the transparent sheets, and small protruding spacers (not shown) printed in a certain pattern so that the opposing electrodes do not contact each other under normal conditions. If the user presses a part on the transparent tablet 3b or 5b with, for instance, a finger or a pen, the opposing transparent electrodes at the pressed part contact each other. The part pressed by the user, i.e., the place selected by the user, is thus detected through the transparent tablets 3b and 5b.

The place selected by the user can also be detected through the liquid crystal display sections 3a and 5a by synchronizing the information about the place selected by the user on the transparent tablets 3b and 5b to the information about the places of contents displayed on the liquid crystal display sections 3a and 5a. A backlight constituted of, for example, an electro luminescence (EL) panel may be provided as necessary on the backside of the liquid crystal display sections 3a and 5a.

Figure 1:
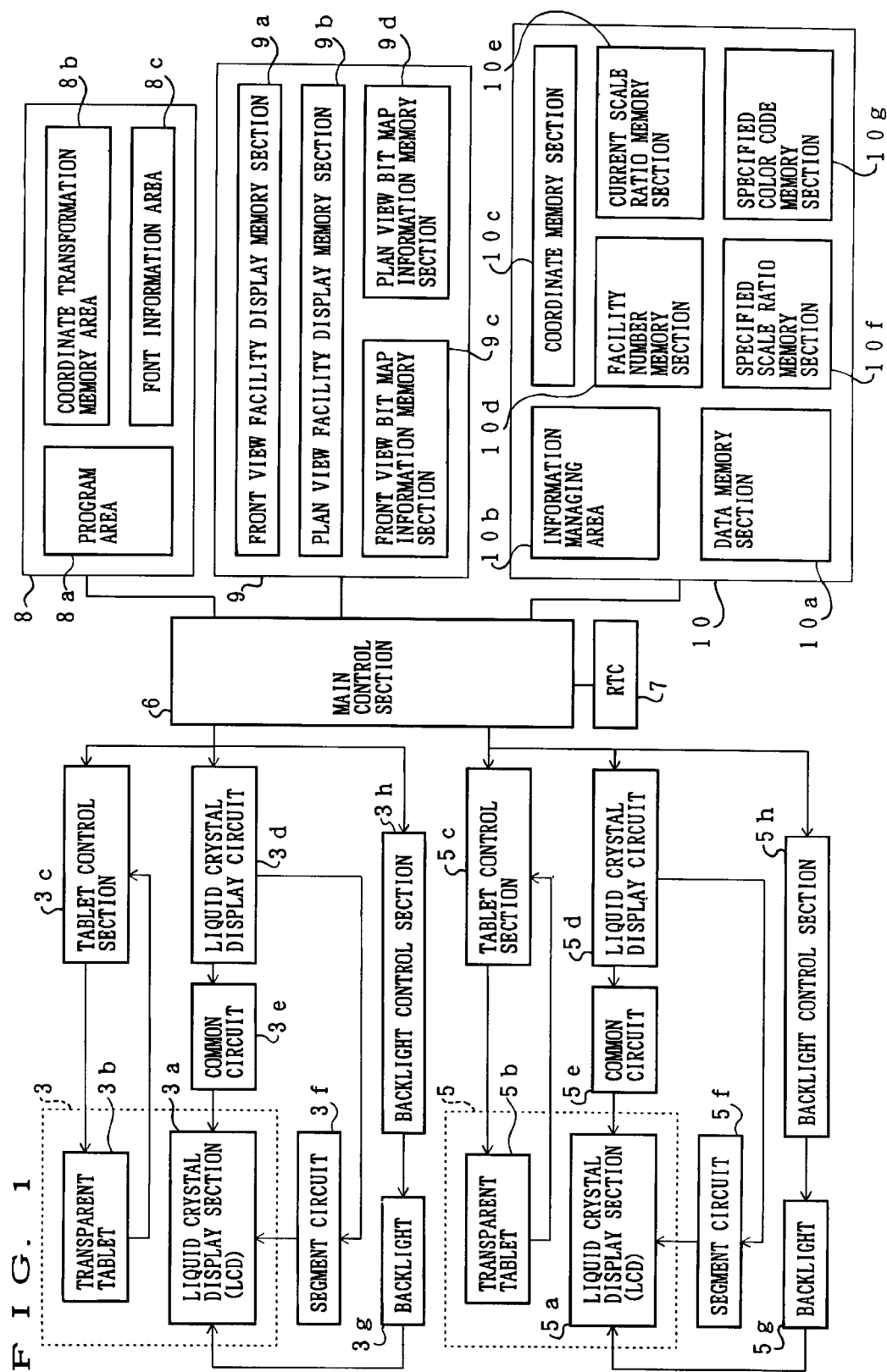
FIG. 1 is a block diagram schematically showing a configuration of an information processing apparatus of first to fourth embodiments in accordance with the present invention.

Now referring to the block diagram of FIG. 1, the following description will explain a configuration of the information processing apparatus in detail.

FIG. 1 is a block diagram schematically showing the configuration of the information processing apparatus. As shown in FIG. 1, the information processing apparatus includes tablet control sections 3c and 5c for respectively deriving information about the coordinates of the place selected on the transparent tablets 3b and 5b of the main body input and output section 3 and the lid body input and output section 5. The tablet control sections 3c and 5c are connected to the transparent electrodes provided to the transparent sheets of the transparent tablets 3b and 5b respectively, detecting the information about the coordinates of the pressed place through the contact of the transparent electrodes caused by pressure exerted by the user with, for instance, a finger or a pen.

The information processing apparatus further includes common circuits 3e and 5e, segment circuits 3f and 5f, liquid crystal display circuits 3d and 5d, backlights 3g and 5g, and backlight control sections 3h and 5h for controlling the turn-on and -off of the backlights 3g and 5g. The liquid crystal display circuits 3d and 5d store locations of dots to be turned on in the liquid crystal dot matrix as a bit map and send electric signals to the common circuits 3e and 5e and the segment circuits 3f and 5f so as to light the liquid crystal dot matrix of the liquid crystal display sections 3a and 5a. The tablet control sections 3c and 5c, the liquid crystal display circuits 3d and 5d, and the backlight control sections 3h and 5h are all connected to a main control section 6 (which will be described later in detail).

The information processing apparatus further includes the main control section (control means) 6, a real time counter (RTC) 7, a read only memory (ROM) 8, and a random access memory (RAM) 10, all being connected to the main control section 6.

The main control section 6 controls input and display using various instructions. Operation of the main control section 6 will be described later in detail. The RTC 7, a counter for measuring time with clock signals (not shown), outputs the current time, date, month and year.

The ROM 8 is constituted by a program area 8a, a coordinate transformation memory area 8b, and a font information area 8c. The program area 8a is for storing a program to operate the main control section 6. The coordinate transformation memory area 8b is for storing transformation information for transforming the coordinates detected by the tablet control sections 3c and 5c into coordinates corresponding to a display location. The font information area 8c is for storing fonts of characters displayed on the liquid crystal display sections 3a and 5a.

The flash memory 9 is constituted by a front view facility display memory section 9a, a plan view facility display memory section 9b, a front view bit map information memory section 9c, and a plan view bit map information memory section 9d.

The front view facility display memory section 9a is for storing information for displaying the front view on the lid body input and output section 5. The plan view facility display memory section 9*b* is for storing information for displaying the plan view on the main body input and output section 3. The information stored in the front view facility display memory section 9*a* and the plan view facility display memory section 9*b* will be described later in detail.

The front view bit map information memory section 9*c* is for storing bit map information of individual facilities displayed on the lid body input and output section 5. The plan view bit map information memory section 9*d* is for storing bit map information of individual facilities displayed on the main body input and output section 3. The information processing apparatus has, as image information, bit map information about later-mentioned eight kinds of facilities stored at a scale-up ratio of 150%, a standard ratio of 100%, and a scale-down ratio of 75% in the front view bit map information memory section 9*c* and the plan view bit map information memory section 9*d*. The bit map information will be described later in detail.

The RAM 10 is constituted by a data memory section loa for storing character information such as a sentence inputted through the main body input and output section 3 and lid body input and output section 5 by the user, an information managing area lob for managing information about the individual facilities, a coordinate memory section 10*c* for storing the coordinates indicated with a pen, etc., a facility number memory section 10*d* for storing the specified facility number, a current scale ratio memory section 10*e* for storing the scale ratio currently in use at the input and output sections 3 and 5, a specified scale ratio memory section 10*f* for storing the scale ratio selected by the user, and a specified color code memory section (specified color memory section) 10*g* for storing the color number (code) corresponding to the color of the arbitrary facility specified by the user.

The specified scale ratio memory section 10*f* stores three scale ratios for each facility number corresponding to one of the later-described individual facilities as shown in FIG. 5: namely a predetermined basic scale ratio (100%), a front view scale ratio as specified by the user, and a plan view scale ratio as specified by the user. The specified color code memory section 10*g* stores two color numbers for each facility number as shown in FIG. 5: namely the color number corresponding to the basic color and the color number corresponding to the color as specified by the user. The color and scale ratio specified by the user will replace the set values and be stored in the current scale ratio memory section 10*e* and the specified color code memory section 10*g*. When no specification is made by the user, the color number and the front and plan view scale ratios are set to "Null", which makes the current scale ratio memory section 10*e* and the specified color code memory section 10*g* store the basic color and the basic scale ratio.

Now referring to FIGS. 6(*a*), 6(*b*), 7(*a*) and 7(*b*), the following description will explain in detail the contents stored in the various memory sections of the flash memory 9.

FIG. 6(*a*) lists the contents stored in the flash memory 9: namely display starting coordinates, display data, a selection-responsive area, a specified facility number for specifying the facility to be displayed by touching later-described right and left moving keys 12 and 11, and names of the facilities for the individual facilities. The selection-responsive area, showing where on the display screen should be touched to select data on display, is specified with, for example, the coordinates of the top left corner and of the bottom right corner of the display region. The display data includes size information of the facility to be displayed and its dot image (bit map information), i.e., a display range originating at the display starting coordinates (the number of dots, etc. representing the width and length of a rectangle in which the facility is displayed) and the bit map information to be displayed in that range. FIG. 6(*b*) is an explanatory drawing showing an example of the display data and the selection-responsive area on the display screens of the main body input and output section 3 and the lid body input and output section 5, with display starting position (50, 25) and a selection-responsive area (45, 20) to (80, 55). The dot image of the facility included in the display data can be stored in compressed form.

Therefore, a predetermined facility can be displayed when the coordinates of the top left corner of the facility display area (the display starting coordinates), the display range (represented by the number of dots counted parallel to the axes of abscissas and ordinates), and the bit map information of the display data are known. The information processing apparatus holds both the display area and the bit map information of the facilities in the display data.

The plan view facility display memory section 9*b* stores, although not shown, the same contents as does the front view facility display memory section 9*a*, except for the specified facility number. The plan view facility display memory section 9*b* reads out the facility number currently stored in the facility number memory section 10*d* of the RAM 10 (see FIG. 1 for both) and displays the facility corresponding to that facility number by referring to the items listed in FIG. 6(*a*).

As listed in FIG. 7(*b*), the front view bit map information memory section 9*c* stores the display data, the selection-responsive area, and the bit map information of the predetermined facilities for individual facility numbers respectively corresponding to the later-described facilities and the individual scale ratios (150%, 100% and 75%). In FIG. 7(*b*), the numbers in the parentheses adjoining to the scale ratios indicate the number of facilities to be displayed on the lid body input and output section 5 (see FIG. 2(*a*)).

As listed in FIG. 7(*a*), the plan view bit map information memory section 9*d* stores the display data and the selection-responsive area for individual facility numbers respectively corresponding to the later-described facilities and for the individual scale ratios (150%, 100% and 75%). In FIG. 7(*a*), the numbers in the parentheses adjoining to the scale ratios indicate the number of facilities to be displayed on the main body input and output section 3 (see FIG. 2(*a*)).

Figure 8:
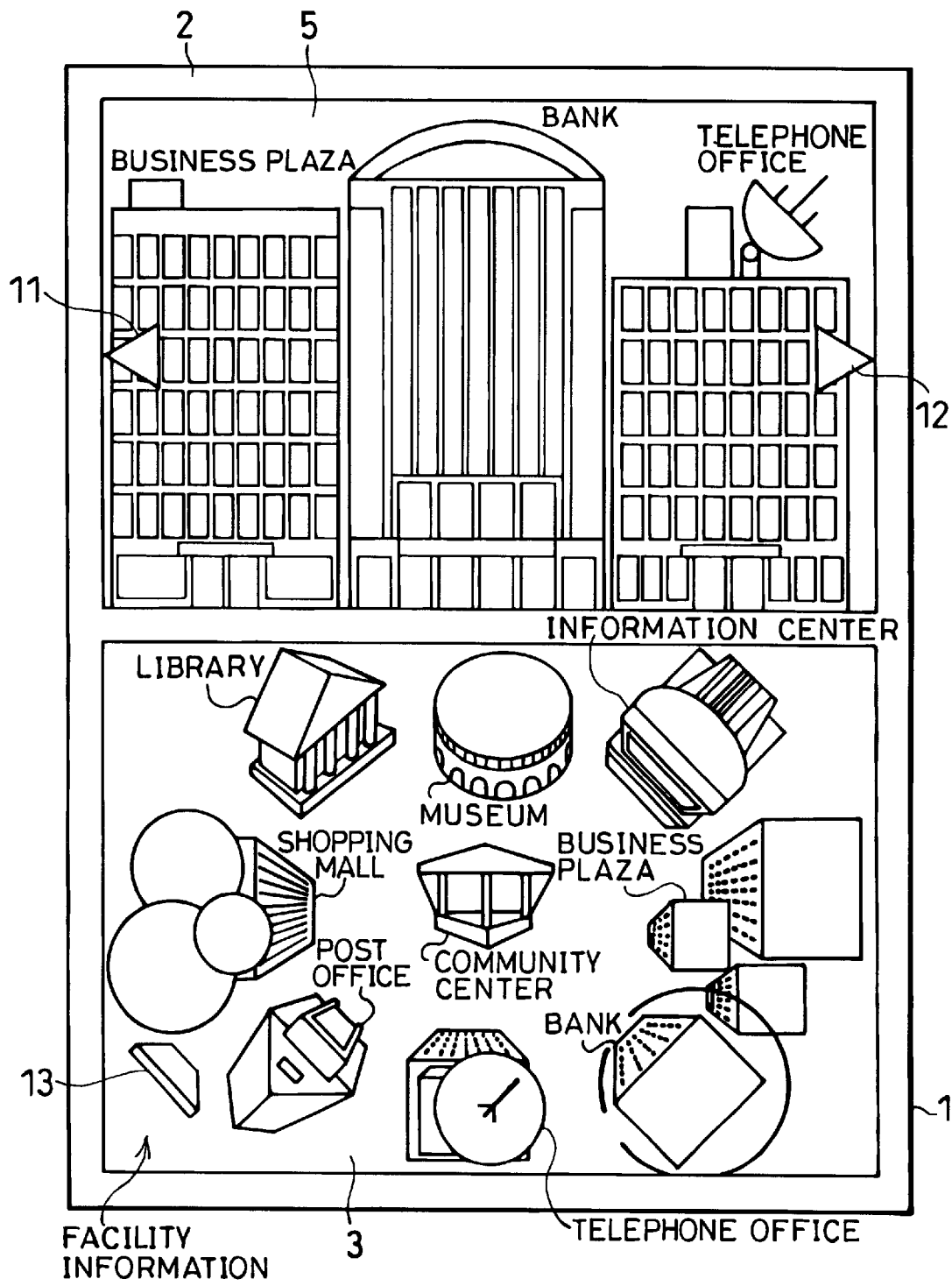
FIG. 8 is a plan view showing a display example by the main body input and output section and the lid body input and output section shown in FIG. 3.

Next referring to FIG. 8, the following description will explain an example of an image displayed by the information processing apparatus. The main body input and output section 3 displays a plan view looking down at facilities that can be displayed by the information processing apparatus, whereas the lid body input and output section 5 displays an enlarged front view of the currently specified facilities.

Taking the illustration in FIG. 8 as an example, the main body input and output section 3 of the information processing apparatus is displaying a plan view of eight facilities arranged around Community Center where the user is currently standing. The eight facilities are Museum, Information Center, Business Plaza, Bank, Telephone Office, Post Office, Shopping Mall, and Library (clockwise from the top). It should be noted in FIG. 8 that the circle drawn around Bank indicates that Bank has been selected by the user, or in other words, that Bank is the specified facility. Meanwhile, the lid body input and output section 5 is displaying a front view of the specified facility, Bank.

In the information processing apparatus, the facilities are given unique facility numbers. Specifically, the facilities are given facility numbers of one through eight in the aforementioned sequence as shown in FIGS. 6(a), 7(a) and 7(b).

The left moving key 11, displayed at the left on the screen of the lid body input and output section 5 in the centered location, is used to shift the view so as to have the facility on the left side of the facility currently on display into sight; similarly, the right moving key 12, displayed at the right on the screen of the lid body input and output section 5 in the centered location, is used to shift the view so as to have the facility on the right side of the facility currently on display into sight.

When the user touches the left moving key 11 on the lid body input and output section 5 with for instance a pen, Business Plaza, situated to the left of Bank, is displayed at the center of the screen of the lid body input and output section 5, and the circle around Bank disappears from the screen of the main body input and output section 3 with a new circle appearing around Business Plaza. When the user touches the right moving key 12 on the lid body input and output section 5 with for instance a pen, Telephone Office, situated to the right of Bank, is displayed at the center of the screen of the lid body input and output section 5, and the circle around Bank disappears from the screen of the main body input and output section 3 with a new circle appearing around Telephone Office.

When the user touches Library on the main body input and output section 3 with for instance a pen, the circle around Bank disappears from the screen of the main body input and output section 3 with a new circle appearing around Library, and the screen of the lid body input and output section 5 displays the front view of Library at the center.

Figure 10A:
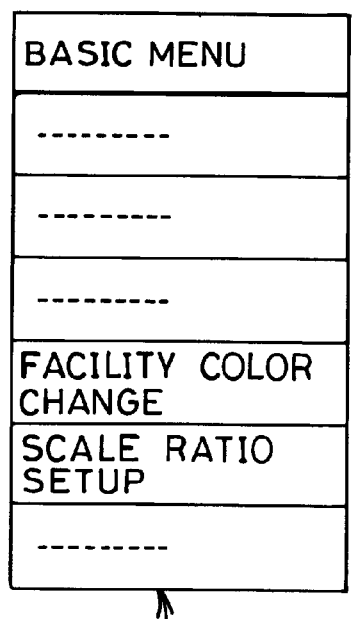
FIG. 10(a) is an explanatory drawing showing a basic menu for the information processing apparatus shown in FIG. 1.

Meanwhile, there is provided a menu key 13 to the main body input and output section 3. When the user selects the menu key 13, a basic menu 14 (which will be described in detail later with reference to FIG. 10(a)) is displayed to allow the user to set and change various items.

Figure 9:
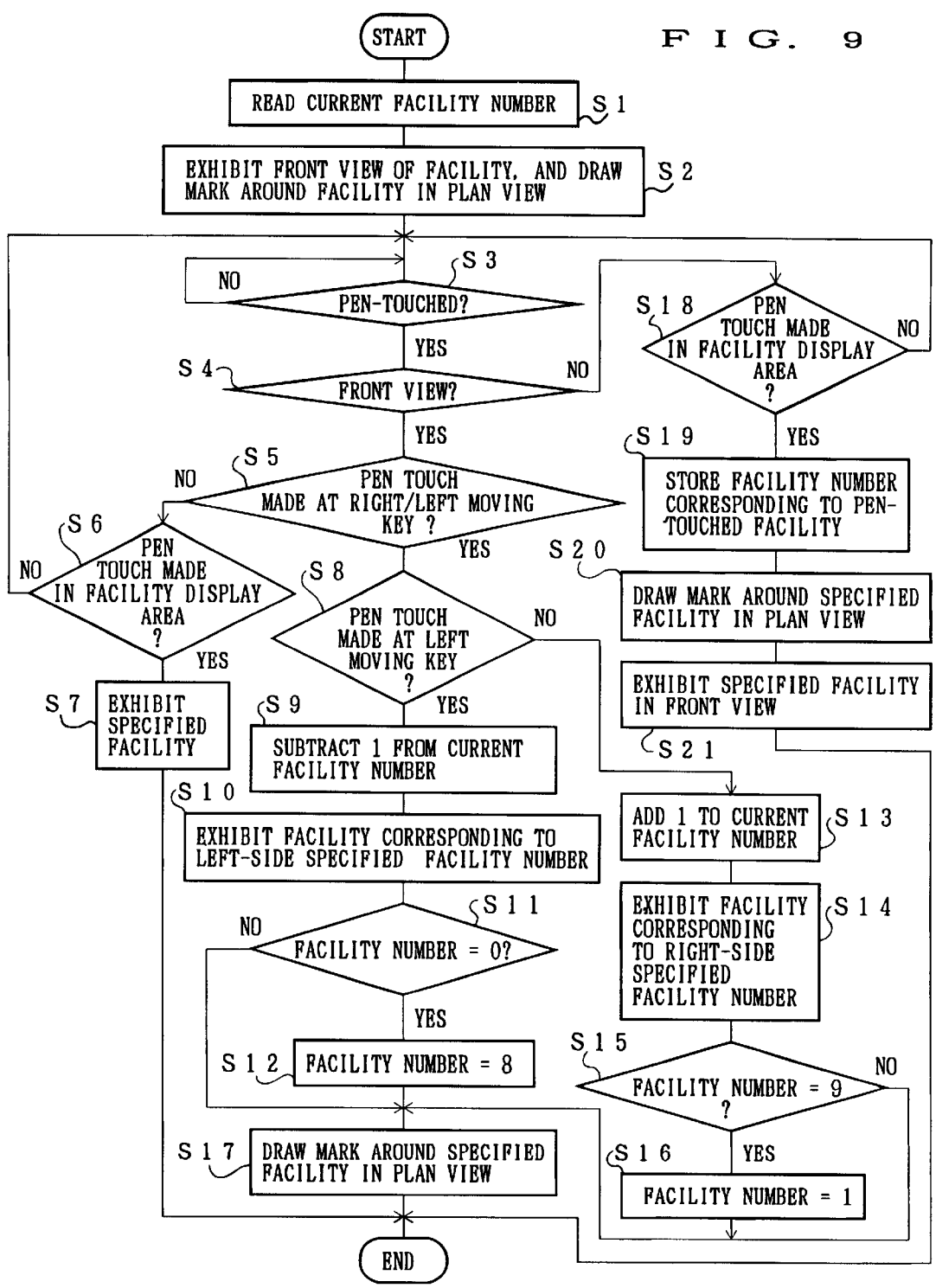
FIG. 9 is a flow diagram showing an operation process, executed by the information processing apparatus shown in FIG. 1, for changing the information displayed on one of the input and output sections in response to a change made in the information displayed on the other input and output section.

Next referring to the flow diagram in FIG. 9, the following description will explain an operation process for changing the display on one of the input and output sections 3 and 5 in response to a change in the display on the other input and output section by the control of the main control section 6.

First, the main control section 6 reads out the facility number currently stored in the facility number memory section 10d of the RAM 10 (see FIG. 1 for both; Step 1 (hereinafter, "Step" will be abbreviated and referred to as "S")). Then, the lid body input and output section 5 (see FIG. 2(a)), controlled by the main control section 6, displays the front view of the facility corresponding to the read-out facility number and draws a mark around the facility displayed in the plan view on the main body input and output section 3 (see FIG. 2(a); S2).

The main control section 6 awaits a pen touch on the display screen, judging whether there has been a pen touch on one of the display screens of the main body input and output section 3 and the lid body input and output section 5 (S3). If the main control section 6 judges in S3 that there has been a pen touch on one of the display screens, the main control section 6 then judges whether or not the pen touch has been made in the front view on the lid body input and output section 5 (S4). If the main control section 6 judges in S4 that the pen touch has been made in the plan view on the main body input and output section 3, not in the front view on the lid body input and output section 5, the operation proceeds to S18. S18 and its successive steps will be described later.

If the main control section 6 judges in S4 that the pen touch has been made in the front view on the lid body input and output section 5, the main control section 6 then judges whether the pen touch has been made at the left moving key 11 or at the right moving key 12 (see FIG. 8 for both keys) on the screen (S5). If the main control section 6 judges in S5 that the pen touch has been made at a place other than the keys, the main control section 6 then judges whether the pen touch has been made in a facility display area (S6). If the main control section 6 judges in S6 that the pen touch has not been made in a facility display area, the operation returns to S3. If the main control section 6 judges in S6 that the pen touch has been made in a facility display area, the main control section 6 allows display of the facility. The judgement whether the pen touch has been made in a facility display area can be made depending upon whether the pen touch has been made in the selection-responsive area shown in FIGS. 6(a) and 6(b).

If the main control section 6 judges in S5 that the pen touch has been made either on the left moving key 11 or on the right moving key 12, the main control section 6 then judges on which key the pen touch has been made (S8). If the main control section 6 judges in S8 that the pen touch has been made at the left moving key 11, the main control section 6 subtracts one from the facility number stored in the facility number memory section 10d (S9). For example, the facility number 3 for Business Plaza is obtained from the subtraction of one from the currently stored facility number 4.

Next, the main control section 6 refers to the specified facility number shown in FIG. 6(a) and displays a front view of the facility corresponding to the leftside specified facility number for the currently stored facility number in the middle on the display screen of the lid body input and output section 5 (S10). For example, the front view of the facility (Business plaza) corresponding to the left-side specified facility number 3 for the current facility number 4 is displayed.

The main control section 6 then judges whether the facility number obtained from the calculation in S9 equals 0 (S11). If the facility number is not equal to 0, the main control section 6 draws a mark around the facility corresponding to that facility number in the plan view on the main body input and output section 3 (S17). Meanwhile, if the facility number equals 0 in S11, the main control section 6 stores the facility number 8 in the facility number memory section 10d (S12) and draws a mark around the facility, Library, corresponding to the facility number 8 in the plan view on the main body input and output section 3 (S17).

On the other hand, if the main control section 6 judges in S8 that the pen touch has been made at the right moving key 12, not on the left moving key 11, the main control section 6 adds one to the facility number stored in the facility number memory section 10d (S13). For example, the facility number 5 for Telephone Office is obtained from the addition of one to the currently stored facility number 4.

Next, the main control section 6 refers to the specified facility number shown in FIG. 6(a) and displays a front view of the facility corresponding to the right-side specified facility number for the currently stored facility number in the middle on the display screen of the lid body input and output section 5 (S14). For example, the front view of the facility (Telephone Office) corresponding to the right-side specified facility number 5 for the current facility number 4 is displayed.

The main control section 6 then judges whether the facility number obtained from the calculation in S13 equals 9, or in other words, whether that facility number exceeds 8 (S15). If the facility number is not equal to 9, the main control section 6 draws a mark around the facility corresponding to that facility number in the plan view on the main body input and output section 3 (S17). Meanwhile, if the facility number equals 9 in S15, the main control section 6 stores the facility number 1 in the facility number memory section 10*d* (S16) and draws a mark around the facility, Museum, corresponding to the facility number 1 in the plan view on the main body input and output section 3 (S17).

By contrast, if the main control section 6 judges in S4 that the pen touch has been made in the plan view on the main body input and output section 3, not on the front view of the lid body input and output section 5, the main control section 6 judges whether the pen touch has been made in a facility display area of the plan view (S18). The judgement whether the pen touch has been made in a facility display area can be made depending upon whether the pen touch has been made in the selection-responsive area shown in FIGS. 6(*a*) and 6(*b*). If the main control section 6 judges in S18 that the pen touch has not been made in a facility display area, the operation returns to S3.

If the main control section 6 judges in S18 that the pen touch has been made in a facility display area, the main control section 6 stores in the facility number memory section 10*d* the facility number corresponding to the facility that has been touched (S19). For example, the main control section 6 stores the facility number 8 corresponding to Library in the facility number memory section 10*d* in response to a pen touch made in the selection-responsive area shown for Library. Next, the main control section 6 draws a mark around the facility corresponding to the facility number read out of the facility number memory section 10*d* (S20). The main control section 6 then displays in the middle on the display screen of the lid body input and output section 5 the front view of the facility corresponding to the facility number read out of the facility number memory section 10*d* (S21) in response to the change of the facility resulting from the execution of S18 to S20.

According to the above configuration, for instance, if the facility with the facility number 3, i.e. Business Plaza, is specified with the left moving key 11 or the right moving key 12 on the lid body input and output section 5, the screen of the lid body input and output section 5 displays the front view of Business Plaza in its center, and a mark is drawn around Business Plaza on display in the bird's eye view on the main body input and output section 3.

By contrast, for instance, if the facility with the facility number 5, i.e. Telephone Office, is specified with a pen touch, a mark is drawn around Telephone Office on display in the bird's eye view on the main body input and output section 3, and the screen of the lid body input and output section 5 displays the front view of Telephone Office in its center.

As described so far, the configuration of the information processing apparatus allows a change of the facility on display to another facility on one of the main body input and output section 3 and the lid body input and output section 5 in conjunction with a change to that other facility on the other input and output section. Therefore, the user can locate the facility that he/she is looking at on one of the input and output sections 3 and 5, on the other input and output section easily. Moreover, as the user looks at the main body input and output section 3 and lid body input and output section 5, he/she can view the facilities at his/her actual height and from the above, and thereby can recognize the location of the facility accurately in a three-dimensional manner. Therefore, the above configuration realizes a two-screen GUI in a three-dimensional manner and produces images with a natural appearance.

In addition, the display screens of the main body input and output section 3 and lid body input and output section 5 are structured integrally with the touch type tablets in the above configuration, allowing the user to directly specify a facility on the display screens of the main body input and output section 3 and the lid body input and output section 5. This enables the user to quickly select the facility that he/she needs and to quickly and easily edit (change, add, delete, copy, etc.) the displayed facilities.

The user can reach the facility that he/she needs either by sequentially browsing the facilities or by directly jumping to the facility that he/she needs. The browsing method alone is time consuming. The jumping method is more time consuming than the browsing method, when the user knows that the facility that he/she needs is located next to the facility currently on display. The above configuration therefore allows the user to quickly select the facility that he/she needs by enabling the two methods to be used in combination.

[Second Embodiment]

The following description will discuss a second embodiment of the present invention. Since the configuration of the information processing apparatus of the second embodiment is essentially the same as that of the first embodiment. Members of the second embodiment that have the same arrangement and function as members of the first embodiment, and that are mentioned in the first embodiment are indicated by the same reference numerals, and description thereof is omitted.

Figure 10B:
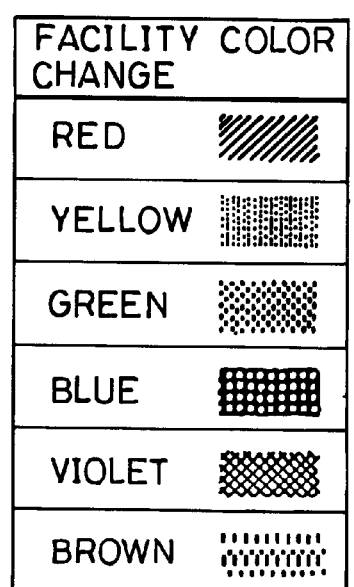
FIG. 10(b) is an explanatory drawing showing a facility color change menu for the information processing apparatus shown in FIG. 1.

The main body input and output section 3 (see FIG. 8) of the information processing apparatus of the present embodiment is provided with a menu key 13 (see FIG. 8). When the user touches the menu key 13 with, for example, a pen, the basic menu 14 is displayed as shown in FIG. 10(*a*). The basic menu 14 contains menus such as "Facility Color Change" and "Scale Ratio Setup."

If Facility Color Change is selected in the basic menu 14, a facility color change menu 15 is displayed as shown in FIG. 10(*b*). The information processing apparatus thus allows the color of the facility to be chosen, and changed accordingly, from red, yellow, green, blue, violet and brown by referring to the facility color change menu 15; however, other colors may be added to the choices.

How to select Scale Ratio Setup in the basic menu 14 and thereby enlarge and diminish the displayed facilities will be explained in a third embodiment.

Now referring to the flow diagram in FIG. 11, the following description will explain an operation process, controlled by the main control section 6 (see FIG. 1), for changing the color of the facility displayed on one of the input and output sections 3 and 5 to a predetermined color in response to a change in the color of the facility to that predetermined color on the other input and output section.

The main control section 6 awaits a pen touch on the display screen of the main body input and output section 3, judging whether there has been a pen touch on the display screen of the main body input and output section 3 (see FIG. 2(*a*); S31). If the main control section 6 judges in S31 that there has been a pen touch on the display screen, the main control section 6 then judges whether or not the pen touch has been made in the facility color change menu 15 (see FIG. 10(*b*); S32). If the main control section 6 judges in S32 that the pen touch has not been made in the facility color change menu 15, no action is taken.

On the other hand, if the main control section 6 judges in S32 that the pen touch has been made in the facility color change menu 15, the main control section 6 finds out the color corresponding to the coordinates of the place where the pen touch has been made by coordinate transformation (S33), and stores the color number (code) corresponding to the specified color in the specified color code memory section log of the RAM 10 (see FIG. 1 for both; S34).

Next, the main control section 6 reads the facility number corresponding to the facility currently specified in the plan view on the main body input and output section 3 out of the facility number memory section lod (see FIG. 1), and reads the color number for that facility number out of the specified color code memory section 10g (S35; the color number here corresponds to the specified color number in FIG. 5). The main control section 6 then changes the display color of the facility specified in the plan view to the color corresponding to the specified color number (S36).

Next, the main control section 6 reads the facility number corresponding to the specified facility on display in the front view on the lid body input and output section 5 (see FIG. 2(a)) out of the facility number memory section 10d, and reads the color number for that facility number out of the specified color code memory section 10g (S37). The main control section 6 then changes the display color of the facility specified in the front view to the color corresponding to the specified color number (S38).

As an example, the above configuration enables the main body input and output section 3 and the lid body input and output section 5 to display Information Center when the user specifies Information Center with the operation process laid out in the first embodiment. Subsequently, the configuration allows the basic menu 14 shown in FIG. 10(a) to be displayed when the user touches the menu key 13 on the main body input and output section 3 shown in FIG. 8 with a pen, and the facility color change menu 15 shown in FIG. 10(b) to be displayed when the user selects Facility Color Change in the basic menu 14.

In addition, when the user specifies a color in the facility color change menu 15 to change the color of Information Center either on the main body input and output section 3 or on the lid body input and output section 5 to red, for example, the main control section 6 automatically changes the color of Information Center displayed on the other input and output section to red.

In other words, the configuration, as an example, eliminates the hassle of changing the color on both screens when a facility frequented by the user is to be marked in color, allowing a color change on one of the input and output sections 3 and 5 to automatically result in the same color change on the other input and output section. Therefore, the configuration saves part of the work to be done by the user to change the color of the facility, enabling the color to be changed quickly.

Moreover, the configuration can create a naturally looking three-dimensional environment to the user. Also if, for example, Information Center is frequented, the configuration can create an environment in which Information Center can be easily spotted, by changing the display color for Information Center to a predetermined color (e.g. red).

In the present embodiment, the color of the facility that has been already specified to the basic color (see FIG. 5) is changed. However, the color may be changed by the above operation process, after the colors of the facilities are specified first.

[Third Embodiment]

The following description will discuss a third embodiment of the present invention. Since the configuration of the information processing apparatus of the third embodiment is essentially the same as those of the first and second embodiments. Members of the third embodiment that have the same arrangement and function as members of the first or second embodiment, and that are mentioned in the first or second embodiment are indicated by the same reference numerals a and description thereof is omitted.

Note in the following description that Facility 1, Facility 2 . . . , and Facility 8 represent the facilities corresponding to facility numbers 1, 2 . . . , and 8: namely Museum, Information Center . . . , and Library.

Figure 12A:
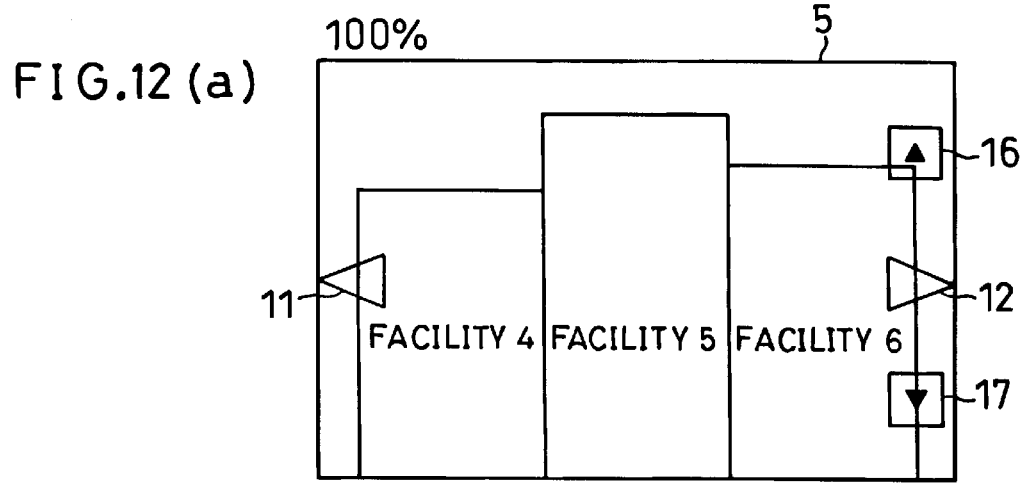
FIG. 12(a) is an explanatory drawing showing an image displayed in a scale ratio of 100% (standard) on the lid body input and output section shown in FIG. 3.
Figure 12B:
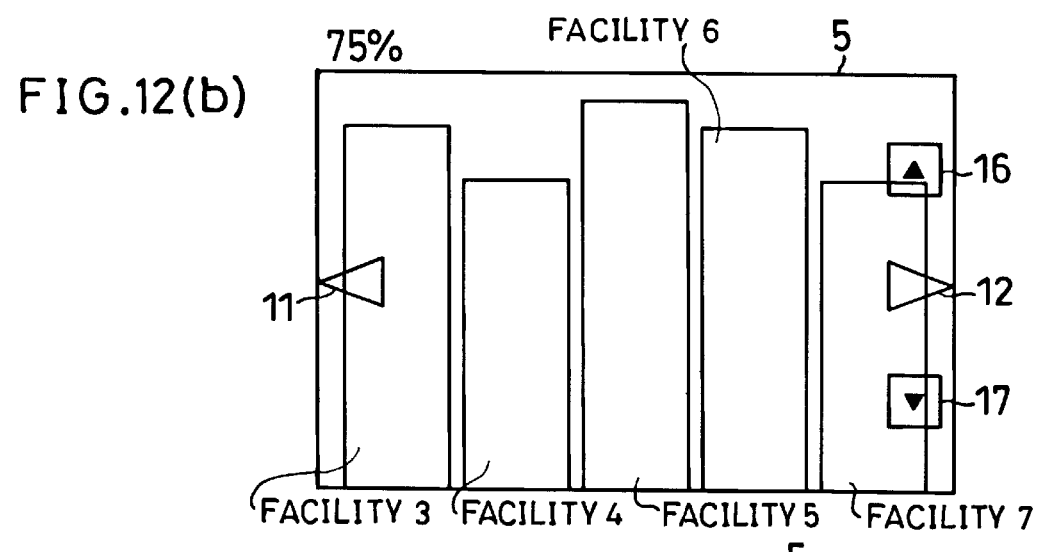
FIG. 12(b) is an explanatory drawing showing a diminished image displayed in a scale ratio of 75% on the lid body input and output section shown in FIG. 3.
Figure 12C:
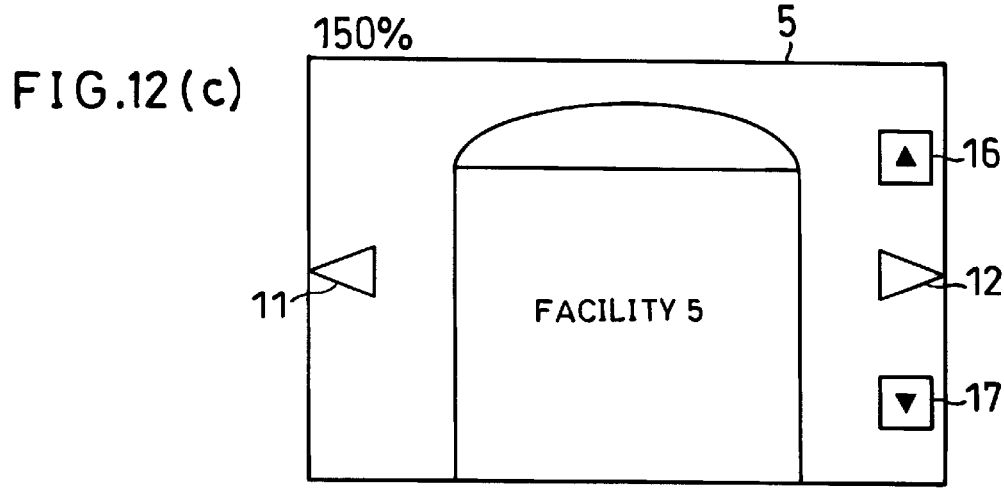
FIG. 12(c) is an explanatory drawing showing an enlarged image displayed in a scale ratio of 150% on the lid body input and output section shown in FIG. 3.
Figure 13A:
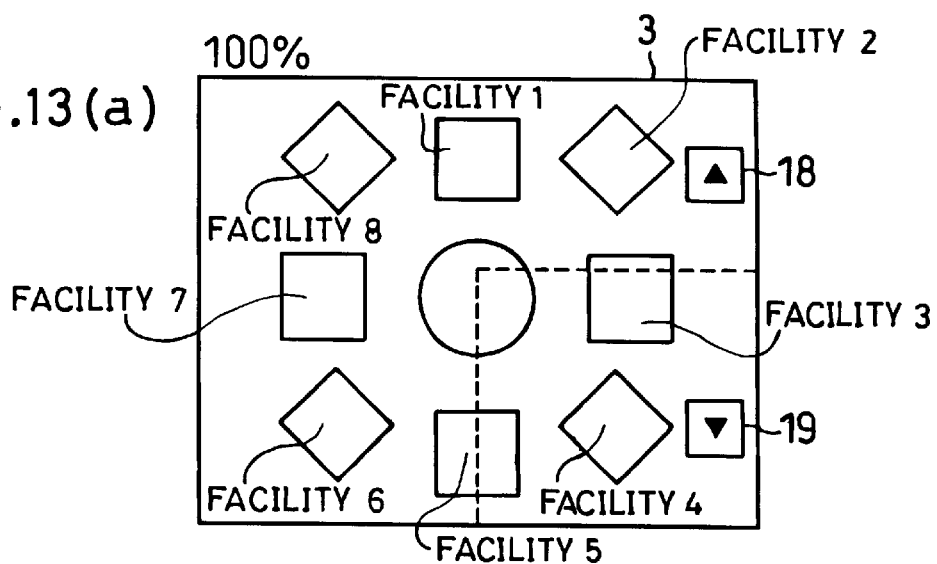
FIG. 13(a) is an explanatory drawing showing an image displayed in a scale ratio of 100% (standard) on the main body input and output section shown in FIG. 3.
Figure 13B:
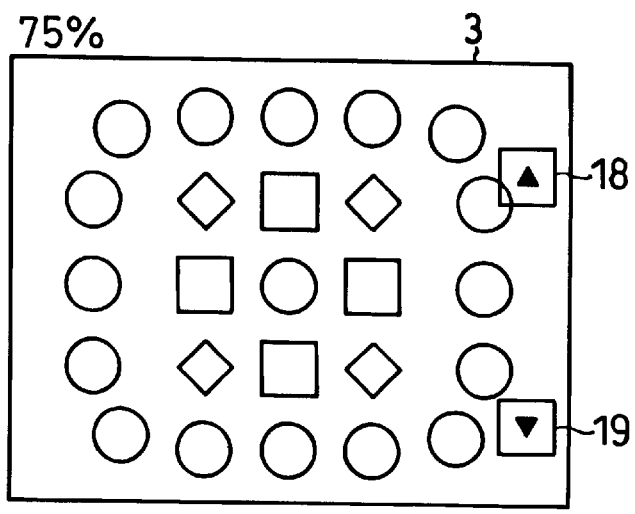
FIG. 13(b) is an explanatory drawing showing a diminished image displayed in a scale ratio of 75% on the main body input and output section shown in FIG. 3.
Figure 13C:
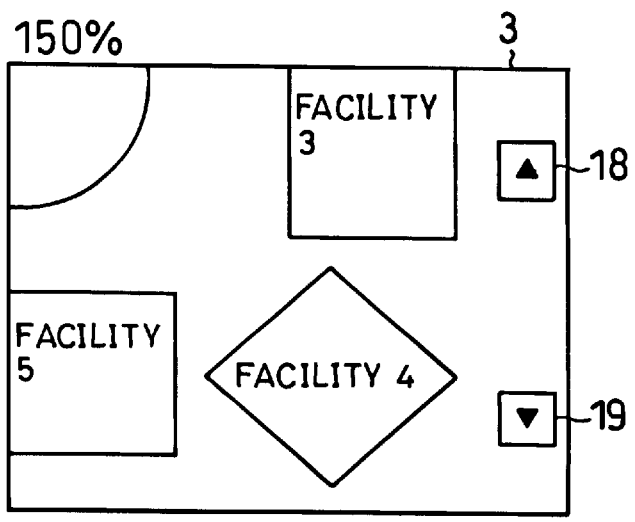
FIG. 13(c) is an explanatory drawing showing an enlarged image displayed in a scale ratio of 150% on the main body input and output section shown in FIG. 3.

FIGS. 12(a) through 12(c) are explanatory drawings showing the lid body input and output section 5 of the information processing apparatus. As can be understood from these figures, a front view enlargement key 16 and a front view diminution key 17 are provided, respectively, on the top right and bottom right corners of the screen of the lid body input and output section 5 of the information processing apparatus for inputting commands to enlarge and diminish the front view. FIGS. 13(a) through 13(c) are explanatory drawings showing the main body input and output section 3 of the information processing apparatus.

If the user presses the front view enlargement key 16 with a pen, as an example, the front view having been displayed in a scale ratio of 100% as shown in FIG. 12(a) is enlarged and displayed in a scale ratio of 150% as shown in FIG. 12(c). In response to that enlargement, the plan view having been displayed in a scale ratio of 100% as shown in FIG. 13(a) is enlarged and displayed in a scale ratio of 150% as shown in FIG. 13(c). By contrast, If the user presses the front view diminution key 17 with a pen, as an example, the front view having been displayed in a scale ratio of 100% as shown in FIG. 12(a) is diminished and displayed in a scale ratio of 75% as shown in FIG. 12(b). In response to that diminution, the plan view having been displayed in a scale ratio of 100% as shown in FIG. 13(a) is diminished and displayed in a scale ratio of 75% as shown in FIG. 13(b).

As shown in FIGS. 13(a) through 13(c), a plan view enlargement key 18 and a plan view diminution key 19 are provided, respectively, on the top right and bottom right corners of the screen of the main body input and output section 3 of the information processing apparatus for inputting commands to enlarge and diminish the plan view. If the user presses the plan view enlargement key 18 with a pen, as an example, the plan view having been displayed in a scale ratio of 100% as shown in FIG. 13(a) is enlarged and displayed in a scale ratio of 150% as shown in FIG. 13(c). In response to that enlargement, the front view having been displayed in a scale ratio of 100% as shown in FIG. 12(a) is enlarged and displayed in a scale ratio of 150% as shown in FIG. 12(c). By contrast, If the user presses the plan view diminution key 19 with a pen, as an example, the plan view having been displayed in a scale ratio of 100% as shown in FIG. 13(a) is diminished and displayed in a scale ratio of 75% as shown in FIG. 13(b). In response to that diminution, the front view having been displayed in a scale ratio of 100% as shown in FIG. 12(a) is diminished and displayed in a scale ratio of 75% as shown in FIG. 12(b).

The plan and front views are displayed based on the bit map information stored, respectively, in the front view bit map information memory section 9c and plan view bit map information memory section 9d (see FIG. 1 for both) of the flash memory 9. The bit map information is produced based on the facility number stored in the facility number memory section 10d (see FIG. 1) and the scale ratios stored in the specified scale ratio memory section 10f of the RAM 10.

The information processing apparatus allows the scale ratio to be specified differently for the two display screens in the menu. FIGS. 14(a) through 14(d) show menus for arbitrarily setting up individual scale ratios for the display screens.

Figure 14:
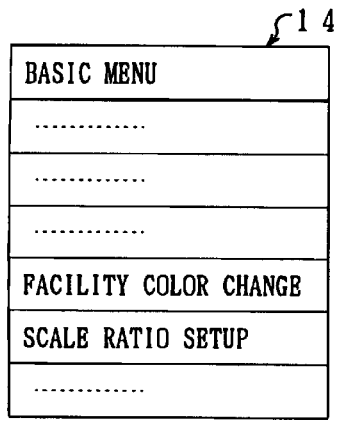
FIG. 14(a) is an explanatory drawing showing a basic menu for the information processing apparatus shown in FIG. 1.
FIG. 14(b) is an explanatory drawing showing a scale ratio setup menu in the basic menu shown in FIG. 14(a).
FIG. 14(c) is an explanatory drawing showing a scale-up ratio setup menu in the scale ratio setup menu shown in FIG. 14(b).
FIG. 14(d) is an explanatory drawing showing a scale-down ratio setup menu in the scale ratio setup menu shown in FIG. 14(b).
Figure 14:
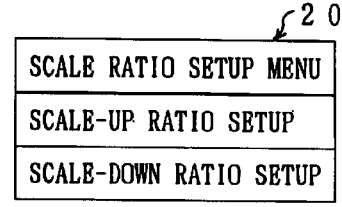
Figure 14:
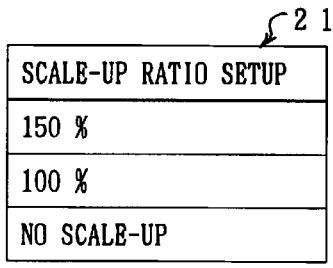
Figure 14:
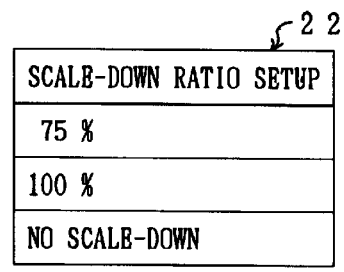

The basic menu 14, as aforementioned and shown in FIG. 14(*a*), contains menus such as "Facility Color Change" and "Scale Ratio Setup." The basic menu 14 is displayed when the user presses the menu key 13 on the main body input and output section 3 (see FIG. 8 for both) with a pen. If the user selects Scale Ratio Setup in the basic menu 14, a scale ratio setup menu 20 is displayed as shown in FIG. 14(*b*).

If the user selects Scale-up Ratio Setup in the scale ratio setup menu 20, a scale-up ratio setup menu 21 containing three menus "150%", "100%" and "No Scale-up" is displayed as shown in FIG. 14(*c*), from which the user can select a desired scale ratio. By contrast, if the user selects Scale-down Ratio Setup in the scale ratio setup menu 20, a scale-down ratio setup menu 22 containing three menus "75%", "100%" and "No Scale-down" is displayed as shown in FIG. 14(*d*), from which the user can select a desired scale ratio. The contents specified in the scale-up ratio setup menu 21 and the scale-down ratio setup menu 22 are stored in the specified scale ratio memory section 10*f*.

Figure 15:
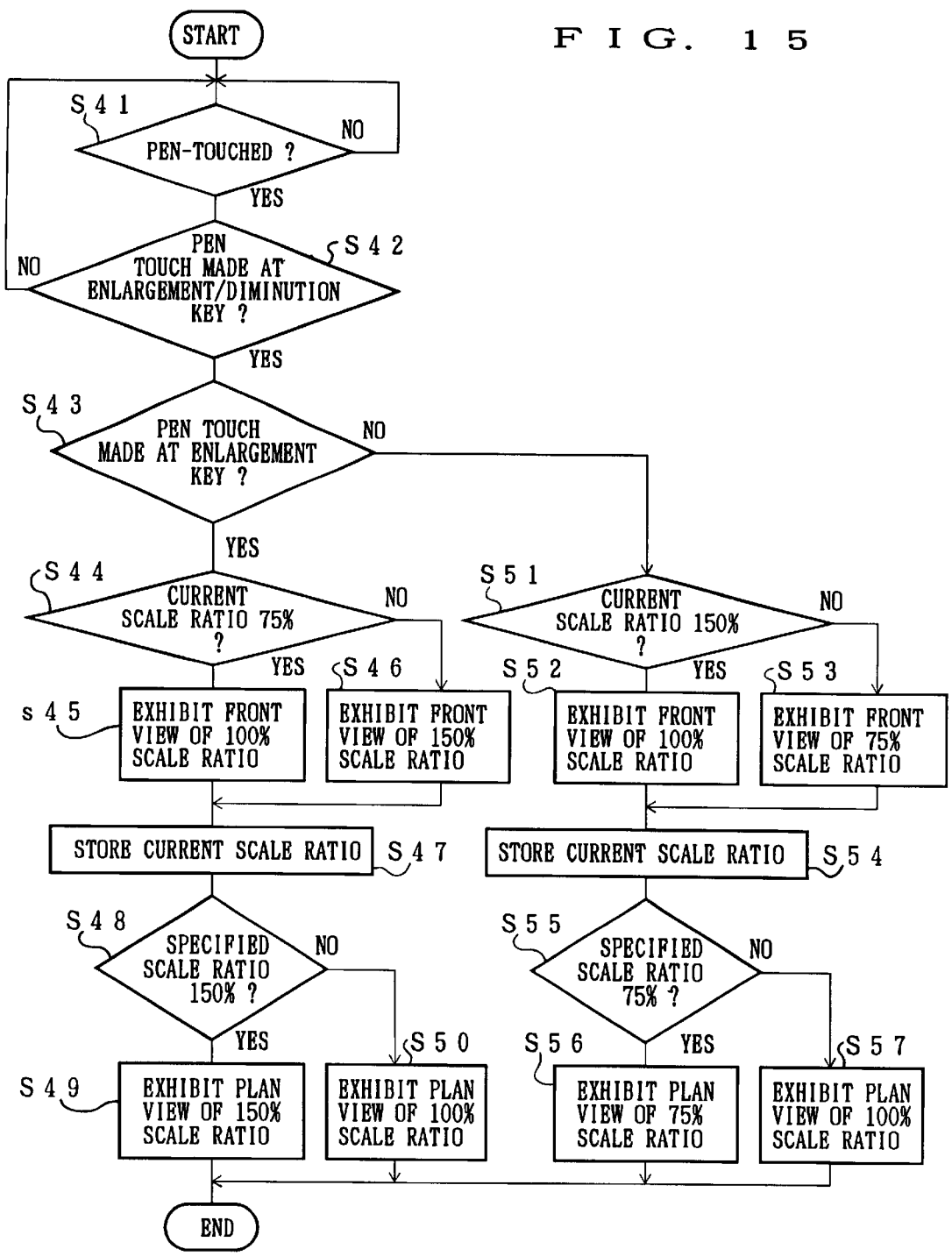
FIG. 15 is a flow diagram showing an operation process, executed by the information processing apparatus shown in FIG. 1, for enlarging or diminishing a plan view displayed on the main body input and output section in response to the enlargement or diminution of the front view displayed on the lid body input and output section.
Figure 16:
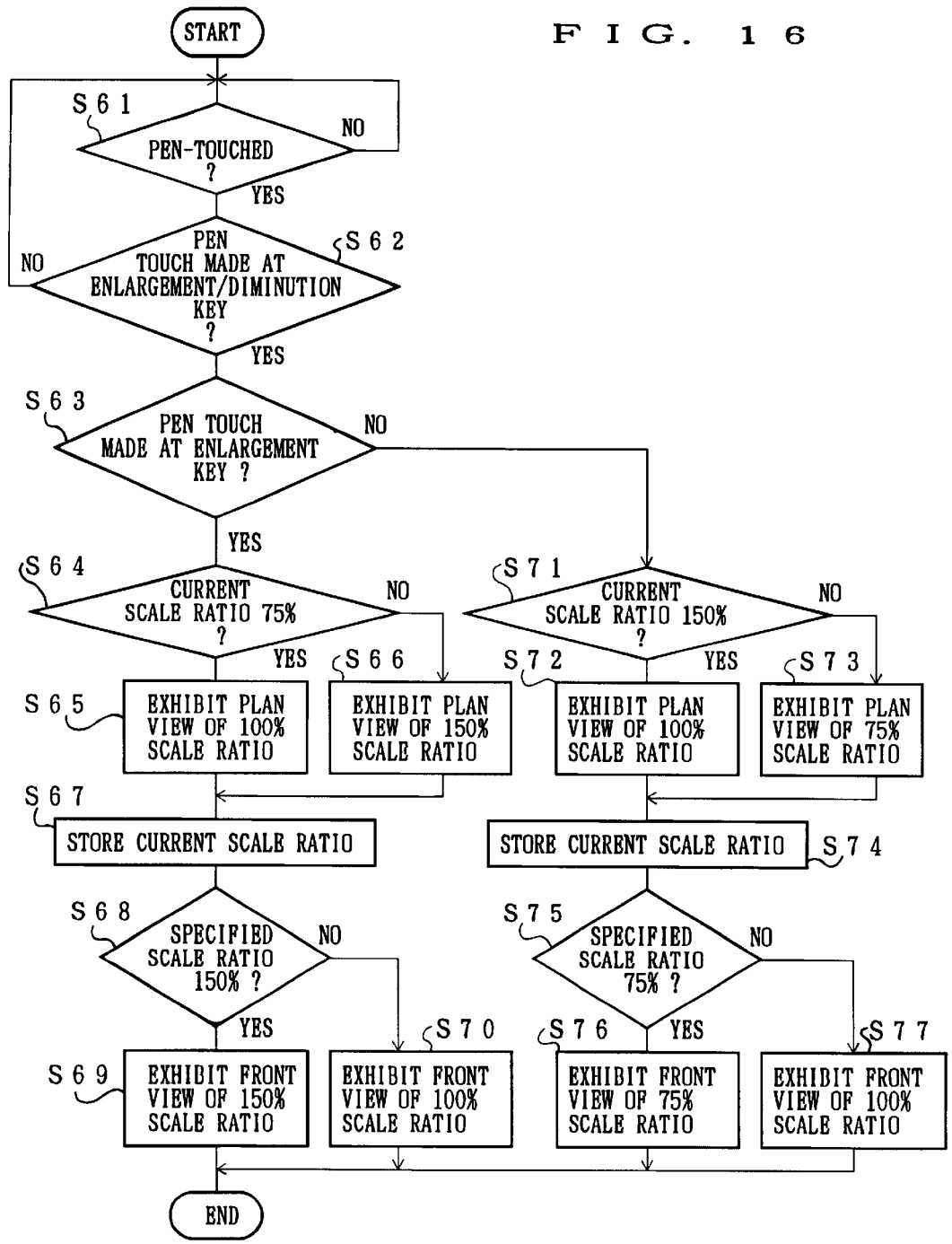
FIG. 16 is a flow diagram showing an operation process, executed by the information processing apparatus shown in FIG. 1, for enlarging or diminishing a front view displayed on the lid body input and output section in response to the enlargement or diminution of the plan view displayed on the main body input and output section.

Now referring to FIGS. 15 and 16, the following description will explain operation processes, controlled by the main control section 6, for enlarging and diminishing a facility displayed on one of the input and output sections 3 and 5 in response to the enlargement and diminution of that facility on the other input and output section. FIG. 15 is a flow diagram showing an operation process for enlarging and diminishing a front view, whereas FIG. 16 is a flow diagram showing an operation process for enlarging and diminishing a plan view. The enlargement and diminution process of the front view will be explained first with reference to FIG. 15.

The main control section 6 awaits a pen touch, judging whether there has been a pen touch in the front view on the lid body input and output section 5 (S41). If the main control section 6 judges in S41 that there has been a pen touch in the front view, the main control section 6 then judges whether the pen touch has been made at one of the front view enlargement key 16 and the front view diminution key 17 (see FIG. 12 for both; S42). If the main control section 6 judges in S42 that the pen touch has been made neither at the front view enlargement key 16 nor at the front view diminution key 17, the operation returns to S41. By contrast, if the main control section 6 judges in S42 that the pen touch has been made either at the front view enlargement key 16 or at the front view diminution key 17, the main control section 6 then judges whether the pen touch has been made at the front view enlargement key 16 or at the front view diminution key 17 (S43). If the main control section 6 judges in S43 that the pen touch has been made at the front view diminution key 17, the operation proceeds to S51. S51 and its successive steps will be described later.

On the other hand, if the main control section 6 judges in S43 that the pen touch has been made at the front view enlargement key 16, the main control section 6 derives the scale ratio for the facility currently on display from the current scale ratio memory section 10*e* of the RAM 10 (see FIG. 1 for both) and judges whether the current display scale ratio is 75% or not (S44). If the main control section 6 judges in S44 that the current display scale ratio is 75%, the main control section 6 reads out the bit map information of the scale ratio of 100% (standard) for the currently selected facility which is stored in the front view bit map information memory section 9*c* of the flash memory 9 (see FIG. 1 for both) as shown in FIG. 7(*b*), and displays that bit map information on the lid body input and output section 5 (S45). By contrast, if the main control section 6 judges in S44 that the current display scale ratio is not 75%, the main control section 6 similarly reads out the bit map information of the scale ratio of 150% for the currently selected facility which is stored in the front view bit map information memory section 9*c*, and displays that bit map information on the lid body input and output section 5 (S46). This judgement made in S44 results in the front view of 150% scale ratio being continuously displayed on the lid body input and output section 5 in S46 if the current display ratio is 150%, i.e., if no further enlargement is possible. The main control section 6 then stores the resultant scale ratio in the current scale ratio memory section 10*e* of the RAM 10 (S47).

Next, the main control section 6 reads the specified scale ratio out of the scale-up ratio setup menu 21, shown in FIG. 14(*c*), stored in the specified scale ratio memory section 10*f* of the RAM 10, and judges the value of the specified scale ratio (S48). If the specified scale ratio is "No Scale-up", no action is taken. If the main control section 6 judges in S48 that the specified scale ratio is 150%, the main control section 6 displays on the main body input and output section 3 the 150% plan view bit map information as shown in FIG. 7(*a*), which is read out of the plan view bit map information memory section 9*d* of the flash memory 9 (S49). The 150% bit map information is a zoom-in of the facility selected in the 100% plan view. By contrast, if the main control section 6 judges in S48 that the specified scale ratio is not 150%, the main control section 6 displays on the main body input and output section 3 the 100% plan view bit map information read out of the plan view bit map information memory section 9*d* (S50).

If the main control section 6 judges in S43 that the pen touch has been made at the front view diminution key 17, the main control section 6 derives the scale ratio for the facility currently on display from the current scale ratio memory section 10*e* of the RAM 10 and judges whether the current display scale ratio is 150% or not (S51). If the main control section 6 judges in S51 that the current display scale ratio is 150%, the main control section 6 reads out the bit map information of the scale ratio of 100% for the currently selected facility which is stored in the front view bit map information memory section 9*c* of the flash memory 9 as shown in FIG. 7(*b*), and displays that bit map information on the lid body input and output section 5 (S52). By contrast, if the main control section 6 judges in S51 that the current display scale ratio is not 150%, the main control section 6 similarly reads out the bit map information of the scale ratio of 75% for the currently selected facility which is stored in the front view bit map information memory section 9*c*, and displays that bit map information on the lid body input and output section 5 (S53). This judgement made in S51 results in the front view of the 75% scale ratio being continuously displayed on the lid body input and output section 5 in S53 if the current display ratio is 75%, i.e., if no further diminution is possible. The main control section 6 then stores the resultant scale ratio in the current scale ratio memory section 10*e* of the RAM 10 (S54).

Next, the main control section 6 reads the specified scale ratio out of the scale-down ratio setup menu 22, shown in FIG. 14(*d*), stored in the specified scale ratio memory section 10*f* of the RAM 10, and judges the value of the specified scale ratio (S55). If the specified scale ratio is "No Scale-down", no action is taken. If the main control section 6 judges in S55 that the specified scale ratio is 75%, the main control section 6 displays on the main body input and output section 3 the 75% plan view bit map information stored as shown in FIG. 7(*a*), which is read out of the plan view bit map information memory section 9*d* of the flash memory 9 (S56). By contrast, if the main control section 6 judges in S55 that the specified scale ratio is not 75%, the main control section 6 displays on the main body input and output section 3 the 100% plan view bit map information read out of the plan view bit map information memory section 9d (S57).

Next, referring to FIG. 16, the following description will explain an operation process of, first, enlarging or diminishing the plan view displayed on the main body input and output section 3 and then enlarging or diminishing the front view displayed on the lid body input and output section 5 in response to that enlargement or diminution of the plan view.

The main control section 6 awaits a pen touch, judging whether there has been a pen touch in the plan view on the main body input and output section 3 (S61). If the main control section 6 judges in S61 that there has been a pen touch in the plan view, the main control section 6 then judges whether the pen touch has been made at one of the plan view enlargement key 18 and the plan view diminution key 19 (see FIG. 13 for both; S62). If the main control section 6 judges in S62 that the pen touch has been made neither at the plan view enlargement key 18 nor at the plan view diminution key 19, the operation returns to S61. By contrast, if the main control section 6 judges in S62 that the pen touch has been made either at the plan view enlargement key 18 or at the plan view diminution key 19, the main control section 6 then judges whether the pen touch has been made at the plan view enlargement key 18 or at the plan view diminution key 19 (S63). If the main control section 6 judges in S63 that the pen touch has been made at the plan view diminution key 19, the operation proceeds to S71. S71 and its successive steps will be described later.

On the other hand, if the main control section 6 judges in S63 that the pen touch has been made at the plan view enlargement key 18, the main control section 6 derives the scale ratio for the facility currently on display from the current scale ratio memory section 10e of the RAM 10 and judges whether the current display scale ratio is 75% or not (S64). If the main control section 6 judges in S64 that the current display scale ratio is 75%, the main control section 6 reads out the bit map information of the scale ratio of 100% for the currently selected facility which is stored in the plan view bit map information memory section 9d (See FIG. 1) of the flash memory 9 as shown in FIG. 7(a), and displays that bit map information on the main body input and output section 3 (S65). By contrast, if the main control section 6 judges in S64 that the current display scale ratio is not 75%, the main control section 6 similarly reads out the bit map information of the scale ratio of 150% for the currently selected facility which is stored in the plan view bit map information memory section 9d, and displays that bit map information on the main body input and output section 3 (S66). This judgement made in S64 results in the plan view of the 150% scale ratio being continuously displayed on the main body input and output section 3 in S66 if the current display ratio is 150%, i.e., if no further enlargement is possible. The main control section 6 then stores the resultant scale ratio in the current scale ratio memory section 10e of the RAM 10 (S67).

Next, the main control section 6 reads the specified scale ratio out of the scale-up ratio setup menu 21, shown in FIG. 14(c), stored in the specified scale ratio memory section 10f of the RAM 10, and judges the value of the specified scale ratio (S68). If the specified scale ratio is "No Scale-up", no action is taken. If the main control section 6 judges in S68 that the specified scale ratio is 150%, the main control section 6 displays on the lid body input and output section 5 the 150% front view bit map information stored as shown in FIG. 7(b), which is read out of the front view bit map information memory section 9c of the flash memory 9 (S69). By contrast, if the main control section 6 judges in S68 that the specified scale ratio is not 150%, the main control section 6 displays on the lid body input and output section 5 the 100% front view bit map information read out of the front view bit map information memory section 9c (S70).

If the main control section 6 judges in S63 that the pen touch has been made at the plan view diminution key 19, the main control section 6 derives the scale ratio for the facility currently on display from the current scale ratio memory section 10e of the RAM 10 and judges whether the current display scale ratio is 150% or not (S71). If the main control section 6 judges in S71 that the current display scale ratio is 150%, the main control section 6 reads out the bit map information of the scale ratio of 100% for the currently selected facility which is stored in the plan view bit map information memory section 9d of the flash memory 9 as shown in FIG. 7(a), and displays that bit map information on the main body input and output section 3 (S72). By contrast, if the main control section 6 judges in S71 that the current display scale ratio is not 150%, the main control section 6 similarly reads out the bit map information of the scale ratio of 75% for the currently selected facility which is stored in the plan view bit map information memory section 9d, and displays that bit map information on the main body input and output section 3 (S73). This judgement made in S71 results in the plan view of the 75% scale ratio being continuously displayed on the main body input and output section 3 in S73 if the current display ratio is 75%, i.e., if no further diminution is possible. The main control section 6 then stores the resultant scale ratio in the current scale ratio memory section 10e of the RAM 10 (S74).

Next, the main control section 6 reads the specified scale ratio out of the scale-down ratio setup menu 22, shown in FIG. 14(d), stored in the specified scale ratio memory section 10f of the RAM 10, and judges the value of the specified scale ratio (S75). If the specified scale ratio is "No Scale-down", no action is taken. If the main control section 6 judges in S75 that the specified scale ratio is 75%, the main control section 6 displays on the lid body input and output section 5 the 75% front view bit map information stored as shown in FIG. 7(b), which is read out of the front view bit map information memory section 9c of the flash memory 9 (S76). By contrast, if the main control section 6 judges in S75 that the specified scale ratio is not 75%, the main control section 6 displays on the lid body input and output section 5 the 100% front view bit map information read out of the front view bit map information memory section 9c (S77).

As described above, with the configuration, if a facility displayed on one of the main body input and output section 3 and the lid body input and output section 5 is enlarged or diminished with a predetermined scale ratio, that facility displayed on the other input and output section is enlarged or diminished with that predetermined scale ratio by the controls of the main control section 6.

In other words, the configuration, as an example, eliminates the hassle of changing the scale ratio of a facility on both screens when the user wants the facility that he/she needs to be enlarged or diminished, allowing a change in scale ratio on one of the input and output sections 3 and 5 to automatically result in the same change in scale ratio on the other input and output section. Therefore, the configuration saves part of the work to be done by the user to enlarge and diminish the facility, enabling the enlargement and diminution to be changed quickly.

Moreover, the configuration allows the specified scale ratio selected on one of the screens by the user to be applied to the facility displayed on the other screen, enabling the facility to be displayed in suitable scale ratios under various conditions. This improves the visual recognition of the facilities by the user.

The display data and the selection-responsive areas for the three scale ratios are stored in a table format in the present embodiment. However, as an alternative, the display data and the selection-responsive areas can be obtained from calculation, allowing the user to specify practically any scale ratio.

The operation processes controlled by the main control section 6 for enlarging and diminishing a displayed image on the main body input and output section 3 and the lid body input and output section 5 are explained in reference to FIGS. 15 and 16 in the present embodiment. However, the operation processes shown in FIGS. 15 and 16 are not the only possible enlargement and diminution processes.

Figure 18:
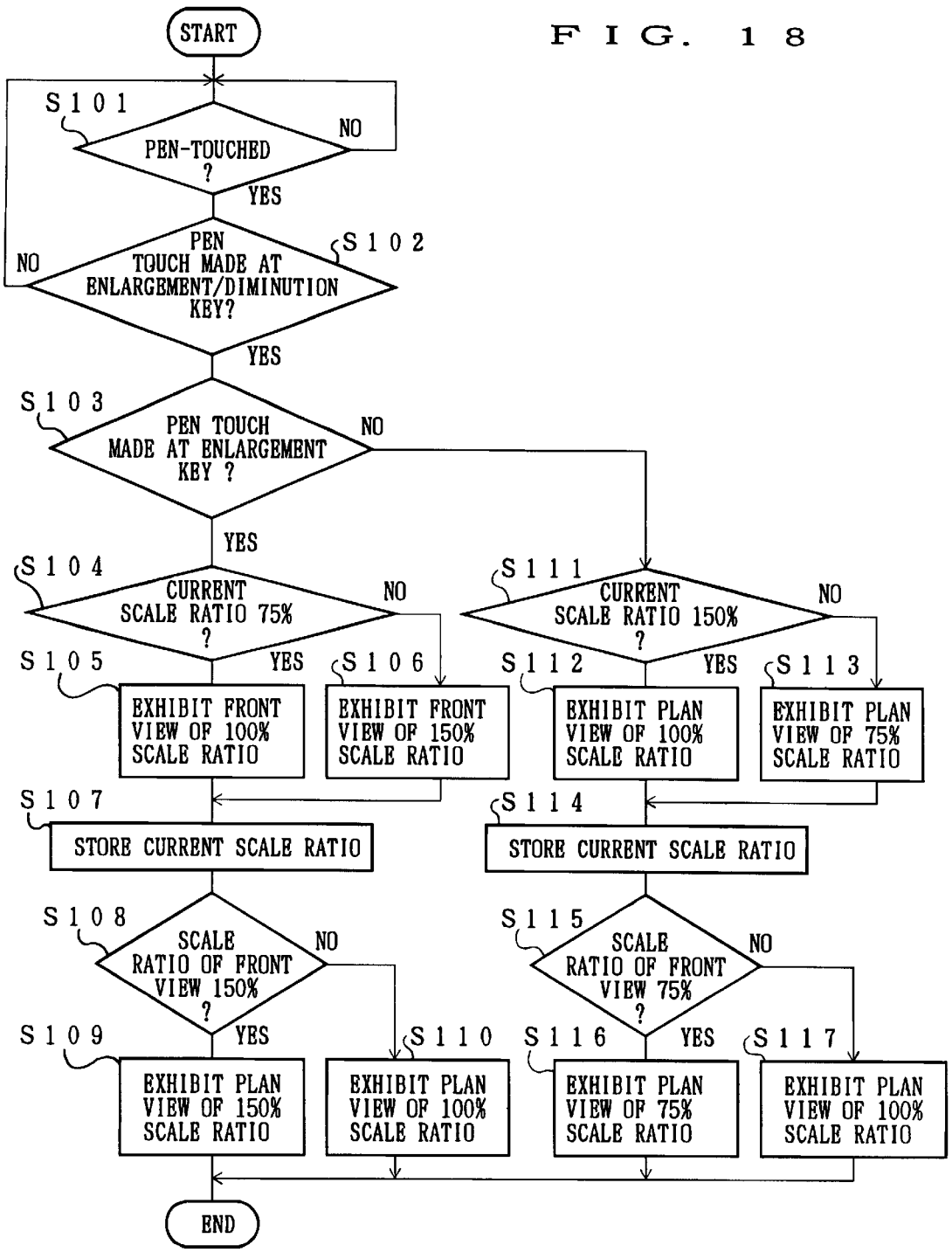
FIG. 18 is a flow diagram showing another operation process, executed by the information processing apparatus shown in FIG. 1, for enlarging or diminishing a plan view displayed on the main body input and output section in response to the enlargement or diminution of the front view displayed on the lid body input and output section.

Alternatives to those operation processes, controlled by the main control section 6, for enlarging and diminishing a displayed image on the main body input and output section 3 and the lid body input and output section 5 are represented by the flow diagrams in FIGS. 18 and 19. The operation process shown in FIG. 18 will be explained first. S101 through S107 in FIG. 18 are the same steps as S41 through S47 in FIG. 15, and S111 through S114 in FIG. 18 are the same steps as S51 through S54 in FIG. 15.

In this operation process, the main control section 6 judges in S108 the current scale ratio for the front view that has been stored in the current scale ratio memory section 10*e* of the RAM 10 in S107. If the main control section 6 judges that the scale ratio is 150%, the main control section 6 changes the scale ratio for the plan view to 150%, or more specifically, reads out the plan view bit map information for the scale ratio of 150% which is stored in the plan view bit map information memory section 9*d* of the flash memory 9 as shown in FIG. 7(*a*), and displays that plan view bit map information on the main body input and output section 3 (S109). By contrast, if the main control section 6 judges in S108 that the scale ratio is not 150%, the main control section 6 changes the scale ratio for the plan view to 100% in a similar manner (S110).

Similarly, the main control section 6 judges in S115 the current scale ratio for the front view that has been stored in the current scale ratio memory section 10*e* of the RAM 10 in S114. If the main control section 6 judges that the scale ratio is 75%, the main control section 6 reads out the plan view bit map information for the scale ratio of 75% which is stored in the plan view bit map information memory section 9*d* of the flash memory 9 as shown in FIG. 7(*a*), and displays that plan view bit map information on the main body input and output section 3 (S116). By contrast, if the main control section 6 judges in S108 that the scale ratio is not 75%, the main control section 6 changes the scale ratio for the plan view to 100% in a similar manner (S117).

As described above, the operation process as illustrated in FIG. 18 always maintains the display scale ratios of the plan view and the front view at the same value, enabling the plan view to be always enlarged and diminished in response to the enlargement and diminution of the front view in the common scale ratio.

Next, the operation process shown in FIG. 19 will be explained. S121 through S123 in FIG. 19 are the same steps as S41 through S43 in FIG. 15. In this operation process, if the main control section 6 judges in S123 that the pen touch has been made at the front view enlargement key 16, the main control section 6 reads the specified scale ratio out of the scale-up ratio setup menu 21 stored in the specified scale ratio memory section 10*f* of the RAM 10 as shown in FIG. 14(*c*), and judges whether the specified scale ratio is "No Scale-up" or not (S124). If the main control section 6 judges that the specified scale ratio is "No Scale-up", the main control section 6 ends the operation. By contrast, if the main control section 6 judges that the specified scale ratio is not "No Scale-up", the main control section 6 judges whether the specified scale ratio is 100% or not (S125). If the main control section 6 judges that the specified scale ratio is 100%, the main control section 6 reads out the bit map information of the scale ratio of 100% for the currently selected facility (standard) which is stored in the front view bit map information memory section 9*c* of the flash memory 9 (see FIG. 1 for both) as shown in FIG. 7(*b*), and displays that bit map information on the lid body input and output section 5 (S126). By contrast, if the main control section 6 judges that the specified scale ratio is not 100%, the main control section 6 similarly changes the scale ratio of the front view to 150% (S127). The operation proceeds to S128 after S126 or S127. S128 through S131 in FIG. 19 are the same steps as S107 through S110 in FIG. 18, representing the operation process of displaying the plan view in the same scale ratio as that for the front view.

On the other hand, if the main control section 6 judges in S123 that the pen touch has not been made at the front view enlargement key 16, the main control section 6 reads the specified scale ratio out of the scale-down ratio setup menu 22 stored in the specified scale ratio memory section 10*f* of the RAM 10 as shown in FIG. 14(*d*), and judges whether the specified scale ratio is "No Scale-up" or not (S132). If the main control section 6 judges that the specified scale ratio is "No Scale-up", the main control section 6 ends the operation. By contrast, if the main control section 6 judges that the specified scale ratio is not "No Scale-up", the main control section 6 judges whether the specified scale ratio is 100% or not (S133). If the main control section 6 judges that the specified scale ratio is 100%, the main control section 6 reads out the bit map information of the scale ratio of 100% for the currently selected facility (standard) which is stored in the front view bit map information memory section 9*c* of the flash memory 9 (see FIG. 1 for both) as shown in FIG. 7(*b*), and displays that bit map information on the lid body input and output section 5 (S134). By contrast, if the main control section 6 judges that the specified scale ratio is not 100%, the main control section 6 similarly changes the scale ratio of the front view to 75% (S135). The operation proceeds to S136 after S134 or S135. S136 through S139 in FIG. 19 are the same steps as S114 through S117 in FIG. 18, representing the operation process of displaying the plan view in the same scale ratio as that for the front view.

As described above, the operation process as illustrated in FIG. 19, similarly to that illustrated in FIG. 18, always maintains the display scale ratios of the plan view and the front view at the same value, enabling the plan view to be always enlarged and diminished in response to the enlargement and diminution of the front view in the common scale ratio. In addition, the user can select a desired scale ratio out of the specified scale ratios.

FIGS. 18 and 19 show the operation processes for a case when the user presses the front view enlargement key 16 or the front view diminution key 17. It is also possible to enlarge and diminish the front view in response to the enlargement and diminution of the plan view in the common scale ratio when the user presses the front view enlargement key 16 and front view diminution key 17 respectively. Such an operation process is possible, for example, by partly changing the operation process shown in FIG. 18, or more specifically, by enlarging or diminishing the plan view in S105 and S106 or in S112 and S113, storing the scale ratio for the plan view in S107 or in S114, judging the value of the scale ratio for the plan view in S108 or in S115, and enlarging or diminishing the front view in S109 and S110 or in S116 and S117. As to the operation process shown in FIG. 19, such an operation process is possible by enlarging or diminishing the plan view in S126 and S127 or in S134 and S135, storing the scale ratio for the plan view in S128 or in S136, judging the value of the scale ratio for the plan view in S129 or in S137, and enlarging or diminishing the front view in S130 and S131 or in S138 and S139.

The operation processes shown in FIGS. 15, 16, 18 and 19 deal with three display scale ratios: 75%, 100% and 150%. However, the display scale ratios for the information processing apparatus, not limited to these values, can be set arbitrarily by the user.

The display scale ratio is commonly changed for all the facilities currently on display, not individually, in the present embodiment. However, the scale ratio can be changed for each facility. A possible setback of setting individual scale ratios for the facilities is lack of a natural appearance in the displayed image. For such a case, it is preferable to enlarge or diminish all the facilities with the common scale ratio.

[Fourth Embodiment]

The following description will discuss a fourth embodiment of the present invention. Since the configuration of the information processing apparatus of the fourth embodiment is essentially the same as those of the first, second and third embodiments for convenience, members of the fourth embodiment that have the same arrangement and function as members of the first, second or third embodiment, and that are mentioned in the first, second or third embodiment are indicated by the same reference numerals and description thereof is omitted.

The information processing apparatus displays the facilities in the same colors and scale ratios when the power is turned on as before the power was turned off. In other words, the information processing apparatus is configured to interpret the color and scale ratio before the power is turned off as the initial setup of the color and scale ratio for the facility to be displayed. Therefore, the information processing apparatus of the fourth embodiment employs the same operation process allowing the user to specify the color and scale ratio as those of the second and third embodiments, and description thereof is omitted. The description below will focus on the operation process after the power is turned on to start the information processing apparatus, with reference to FIG. 17.

Figure 17:
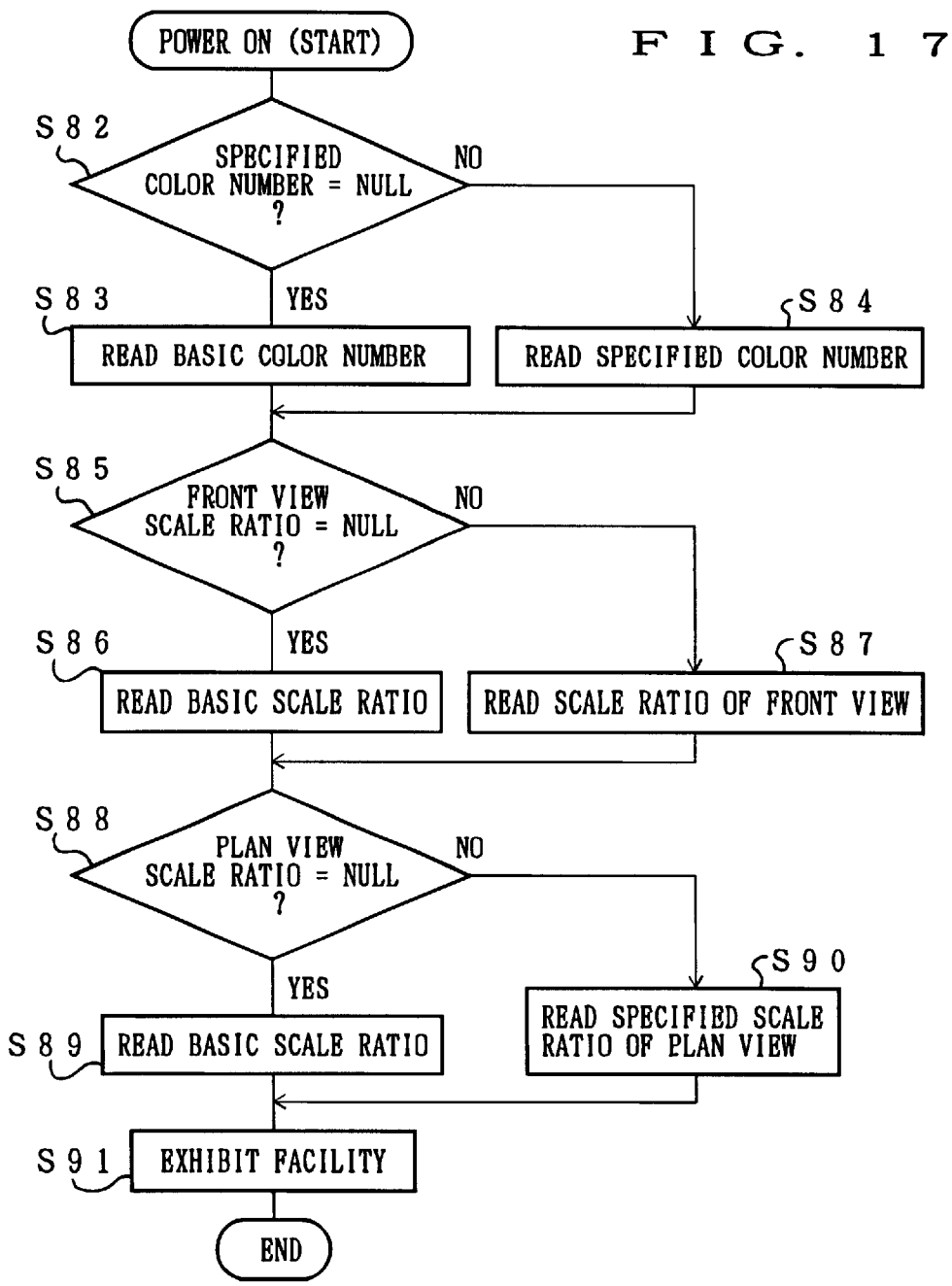
FIG. 17 is a flow diagram showing an operation process, executed by the information processing apparatus shown in FIG. 1 upon turning on the power, for displaying the facilities under setup of, for example, color and a scale ratio, that have been predetermined prior to turning off the power.

FIG. 17 is a flow diagram showing an operation process executed by the information processing apparatus. Upon turning on the main body power supply switch 4 (see FIG. 1), the main control section 6 (see FIG. 1) reads the specified color number out of the specified color code memory section 10g of the RAM 10 (see FIG. 1 for both) and judges whether the specified color number is "Null" (S82). If the main control section 6 judges in S82 that the specified color number is "Null", the main control section 6 reads the basic color number out of the specified color code memory section 10g (S83). By contrast, if the main control section 6 judges in S82 that the specified color number is not "Null", the main control section 6 reads the specified color number out of the specified color code memory section 10g (S84).

The main control section 6 then reads the front view scale ratio out of the current scale ratio memory section 10e (see FIG. 1) of the RAM 10 and judges whether the front view scale ratio is "Null" (S85). If the main control section 6 judges in S85 that the front view scale ratio is "Null", the main control section 6 reads the basic scale ratio out of the current scale ratio memory section 10e (S86). By contrast, if the main control section 6 judges in S85 that the front view scale ratio is not "Null", the main control section 6 reads the front view scale ratio out of the current scale ratio memory section 10e (S87).

The main control section 6 then reads the plan view scale ratio out of the current scale ratio memory section 10e and judges whether the plan view scale ratio is "Null" (S88). If the main control section 6 judges in S88 that the plan view scale ratio is "Null", the main control section 6 reads the basic scale ratio out of the current scale ratio memory section 10e (S89). By contrast, if the main control section 6 judges in S88 that the plan view scale ratio is not "Null", the main control section 6 reads the plan view scale ratio out of the current scale ratio memory section 10e (S90). The main control section 6 thereby displays the plan and front views of the facility on the main body input and output section 3 and the lid body input and output section 5 respectively, based on the specified values read out in S82 through S90.

The main control section 6 reads the specified values in response to the turn-on of the power in the present embodiment. However, the information processing apparatus can still execute the same operation process as above, even if the operation process shown in FIG. 17 is started upon returning to the original screen after ending one of other modes instead of the turn-on of the power. Here, the return to the original screen refers to displaying the facilities again on the display screens of the main body input and output section 3 and the lid body input and output section 5 after, for example, starting another function, such as a memo function or a schedule function, installed in the information processing apparatus, and using the display screens for those purposes other than displaying the facility.

Moreover, a plurality of facilities can be displayed in colors individually specified for the facilities as below. First, S85 through S90 are executed immediately after the operation in FIG. 17 is started so as to read the display scale ratio, and then, S82 to S84 are executed for individual facilities. This operation process allows the facilities to be displayed in individually specified colors.

The above configuration, as described above, enables the main control section 6 to display the facilities on the input and output sections 3 and 5 in the colors stored in advance in the specified color code memory section 10g and in the scale ratios stored in advance in the current scale ratio memory section 10e upon the end of a different mode and the turn-on of the power. This saves the work of specifying the colors and scale ratios again when the power is turned on and when the a different mode is ended. Therefore, the above configuration starts the apparatus more quickly and requires less duty to be done by the user.

Although the present embodiment adopts a configuration in which the color and scale ratio for the facility are initially set to those displayed prior to the turn-off of the power, the information processing apparatus may be configured otherwise. The color and scale ratio can be initially set to those specified by the user prior to the turn-off.

Although the information processing apparatus of the embodiments above are configured to include a main body input and output section 3 and a lid body input and output section 5 connected to each other by hinges 30 so as to be opened and closed, and to include display screens provided on the input and output sections 3 and 5 for displaying the front and plan views of a displayed object, the display screens of the information processing apparatus in accordance with the present invention can take any configuration as long as it includes two display screens. The two display screens may be installed at predetermined places and are not necessarily liquid crystal displays. The input by the user is not necessarily done through the touch type tablet: an alternative is various keys and a pointer controllable with, for example, a mouse displayed on the display screen, enabling the user to input commands for specifying a facility and specifying or changing the display color and display scale ratio with the pointer.

As described so far, an information processing apparatus in accordance with the present invention includes: a first display section, provided to one of a main body member and an open-close member connected to each other by hinges so as to be opened and closed, for displaying a plan view of an object; and a second display section, provided to the other member, for displaying a front view of the object, and further includes control structure for controlling so as to, in response to a change in a display state of the object on one of the first and second display sections in a predetermined manner, change the display state of the object on the other display section in a predetermined manner.

According to the above configuration, for example, the first display section for displaying a plan view of an object is provided to the open-close member, whereas the second display section for displaying a front view of the object is provided to the main body member. When another object is selected, as an example, in the plan view on the first display section, that object is displayed in the plan view on the first display section and in a predetermined manner on the second display section as a result of controls by the control means (e.g., a mark is drawn around the object.)

By contrast, when another object is selected on the second display section, that object is displayed in the plan view on the first display section by the main control section.

According to the above configuration, as described above, if a display state of an object is changed in a predetermined manner on one of the first and second display sections, that display state of that object is changed in response in a predetermined manner on the other display section. This allows the object that the user is looking at on one of the display sections to be easily spotted on the other display section. Moreover, as the user looks at both display sections, he/she can view the facilities at his/her actual height and from above, and thereby can recognize the location of the facility accurately in a three-dimensional manner. Therefore, the above configuration realizes a two-screen GUI in a three-dimensional manner and produces images with a natural appearance.

Alternatively, the information processing apparatus configured as above can be further configured so that the first and second display sections each include a display screen that is integrated with a touch type tablet.

According to this configuration, the user can specify an object directly on the display screens of the first and second display sections. The user therefore can quickly select the object that he/she needs, and quickly and easily edit (change, add, delete, copy, etc.) the displayed objects.

Alternatively, the information processing apparatus configured as above can be further configured so that the control means controls so as to, in response to a change in the color of the object to a predetermined color on one of the first and second display sections, change the color of the object to the predetermined color on the other display section.

According to this configuration, the control structure controls so as to, in response to a change in the color of the object to, for example, red on one of the first and second display sections, change the color of the object to red on the other display section.

In other words, the configuration, as an example, eliminates the hassle of changing the color on both screens when an object frequented by the user is to be marked in color, allowing a color change on one of the display sections to automatically result in the same color change on the other display section. Therefore, the configuration saves part of the work to be done by the user to change the color of the object, enabling the color to be changed quickly.

Alternatively, the information processing apparatus configured as above can be further configured so that the control structure controls so as to, in response to enlargement or diminution of the object on one of the first and second display sections in a predetermined scale ratio, enlarge or diminish the object on the other display section in a predetermined scale ratio.

According to this configuration, the control structure controls so as to, in response to enlargement or diminution of the object on one of the first and second display sections in a predetermined scale ratio, enlarge or diminish the object on the other display section in a predetermined scale ratio.

In other words, the configuration, as an example, eliminates the hassle of changing the scale ratio of an object on both screens when the user wants the object that he/she needs to be enlarged or diminished, allowing a change in scale ratio on one of the input and output sections 3 and 5 to automatically result in the same change in scale ratio on the other input and output section. Therefore, the configuration saves part of the work to be done by the user to enlarge and diminish the facility, enabling the enlargement and diminution to be changed quickly.

Alternatively, the information processing apparatus configured as above can be further configured so that the control structure controls so as to, in response to enlargement or diminution of the object on one of the first and second display sections in a predetermined scale ratio, enlarge or diminish the object on the other display section in an arbitrarily specified scale ratio.

According to this configuration, the control structure controls so as to, in response to enlargement or diminution of the object on one of the first and second display sections in a predetermined scale ratio, enlarge or diminish the object on the other display section in an arbitrarily specified scale ratio. This enables the object to be displayed in suitable scale ratios under various conditions.

Visibility of an object deteriorates contrary to expectations in some cases, if that object is automatically enlarged or diminished on one of the display sections in response to enlargement or diminution on the other display section. However, the configuration can solve such inconvenience and displays the object in a suitable scale ratio to the user. Therefore, the configuration improves the visual recognition of the facilities by the user.

Alternatively, the information processing apparatus configured as above can be further configured so that it further includes: a specified color code memory section for storing the code corresponding to a specified color; and a current scale ratio memory section for storing the current scale ratios for the first and second display sections, wherein the control structure controls so that the object is displayed on the first and second display sections in the color stored in the specified color code memory section and/or in the scale ratio stored in the current scale ratio memory section in advance when the power is turned on and when a different mode is ended.

According to this configuration, the control structure controls so that the object is displayed on the first and second display sections in the color stored in the specified color code memory section and/or in the scale ratio stored in the current scale ratio memory section in advance when the power is turned on and when a different mode is ended. This saves the work of specifying the colors and scale ratios again when the power is turned on and when a different mode is ended. Moreover, the user does not have to remember the colors and scale ratios by himself/herself. Therefore, the configuration starts the apparatus more quickly and requires less duty to be done by the user.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An information processing apparatus, comprising:
    a first display section including a display screen for displaying a plan view of a plurality of objects;
    a second display section including a display screen for displaying a front view of at least a selected object of the plurality of objects and at least one adjacent object of the plurality of objects;
    an input section for allowing a user to instruct a change in a display state of at least one of said display screens of said first and second display sections; and
    control structure for controlling a display state of said display screens of said first and second display sections, and for changing the display state of one of the display screens of said first and second display sections in accordance with an instruction inputted to said input section, and for, in response to a change in the display state of one of said display screens, changing the display state of the other display screen,
    wherein the control means comprises marking means, and wherein in response to selection of the selected object on the display screen of said first display section or second display section through the input section, the marking means marks the selected object in the plan view of the display screen of said first display section, and at least the selected object and the at least one adjacent object are included in the front view of the display screen of the second display section, thereby displaying a relative position of the selected object to the at least one adjacent object.

2. The information processing apparatus as defined in claim 1,
    wherein said input section includes:
        a first input device, provided in the first display section, for changing a display state of the display screen of the first display section, and
        a second input device, provided in the second display section, for changing a display state of the display screen of the second display section.

3. The information processing apparatus as defined in claim 2,
    wherein said first and second input devices are touch type tablets provided on said display screens of said first and second display sections.

4. The information processing apparatus as defined in claim 1,
    wherein, in response to selection of said selected through said input section on one of said display screens of said first and second display sections, said control means positions said object in the middle of said front view on said display screen of said second display section.

5. The information processing apparatus as defined in claim 1,
    wherein a display scale ratio can be specified individually for said plan view on said display screen of said first display section and for said front view on said display screen of said second display section.

6. The information processing apparatus as defined in claim 1,
    wherein said control means can individually change the display state of each object.

7. The information processing apparatus as defined in claim 6,
    wherein the display state of said selected object is the display color of said selected object.

8. The information processing apparatus as defined in claim 6,
    wherein the display state of said selected object is the display scale ratio of said selected object.

9. The information processing apparatus as defined in claim 1,
    further comprising a specified color memory section for storing as the specified color the color, of said selected object, specified by a user,
    wherein, in response to input of an instruction through said input section for changing the display color of said selected object to the color specified by the user on one of said display screens of said first and second display sections, said control means stores the color specified by the user as the specified color in said specified color memory section, reads the specified color out of said specified color memory section, and changes the color of said selected object displayed in said plan view on said display screen of said first display section and in said front view on said display screen of said second display section to the specified color.

10. The information processing apparatus as defined in claim 1,
    further comprising:
        a front view bit map information memory section for storing bit map information of front views of all available scale ratios; and
        a plan view bit map information memory section for storing bit map information of plan views of all available scale ratios,
    wherein, in response to input of an instruction through said input section for changing the display scale ratio of said objects on one of said display screens of said first and second display sections, said control means reads said bit map information out of said plan and front view bit map information memory sections, and displays said objects in the scale ratio in accordance with said instruction.

11. The information processing apparatus as defined in claim 1,
    further comprising:
        a front view bit map information memory section for storing bit map information of front views of all available scale ratios;
        a plan view bit map information memory section for storing bit map information of plan views of all available scale ratios; and
        a specified scale ratio memory section for storing, as a specified scale ratio, a display scale ratio of said objects in said plan and front views specified by a user,
    wherein, in response to input of an instruction through said input section for changing the display scale ratio of said objects on one of said display screens of said first and second display sections, said control means reads said bit map information out of one of said plan and front view bit map information memory sections, and displays said objects in the scale ratio in accordance with said instruction on that one of said display screens, and also reads said bit map information out of the other of said plan and front view bit map information memory sections, and displays said objects in said specified scale ratio stored in said specified scale ratio memory section on the other of said display screens.

12. The information processing apparatus as defined in claim 1,
further comprising:
a front view bit map information memory section for storing bit map information of front views of all available scale ratios;
a plan view bit map information memory section for storing bit map information of plan views of all available scale ratios; and
a specified scale ratio memory section for storing, as a specified scale ratio, a display scale ratio of said objects in said plan and front views specified by a user,
wherein, in response to input of an instruction through said input section for changing the display scale ratio of said objects on one of said display screens of said first and second display sections, said control means reads said bit map information out of said plan and front view bit map information memory sections, and displays said objects in the scale ratio in accordance with said instruction on the display screens of said first and second display sections.

13. The information processing apparatus as defined in claim 1,
further comprising a specified color memory section for storing as the specified color the color, specified by a user; and
a current scale ratio memory section for storing display scale ratio on said display screens of said first and second display sections,
wherein said control structure uses the color and the scale ratio stored respectively in said specified color memory section and in said current scale ratio memory section as an initial setup of the color and the scale ratio for display on said display screens of said first and second display sections.

14. The information processing apparatus as defined in claim 1,
wherein said first and second display sections are provided on respective substrates connected to each other by hinges so as to be opened and closed.

15. The information processing apparatus as defined in claim 1, wherein the plurality of objects are buildings.

16. An information processing apparatus, including:
a first display section, provided to one of a main body member and an open-close member connected to each other by hinges so as to be opened and closed, for displaying a plan view of a plurality of objects;
a second display section, provided to the other member, for displaying a front view of at least a selected object of the plurality of objects and at least one adjacent object of the plurality of objects;
an input section for allowing a user to instruct a change in a display state of at least one of said first and second display sections; and
control means for controlling so as to, in response to a change in the display state of one of said first and second display sections in a predetermined manner via said input section, change the display state of the other display section in a predetermined manner,
wherein the control means comprises marking means, and wherein in response to selection of the selected object on the first display section or second display section through the input section, the marking means marks the selected object in the plan view of the first display section, and at least the selected object and the at least one adjacent object are included in the front view of the second display section, thereby displaying a relative position of the selected object to the at least one adjacent object.

17. The information processing apparatus as defined in claim 16,
wherein said first and second display sections each include a display screen that is integrated with a touch type tablet.

18. The information processing apparatus as defined in claim 16,
wherein said control means controls so as to, in response to a change in the color of said selected object to a predetermined color on one of said first and second display sections, change the color of said selected object to the predetermined color on the other display section.

19. The information processing apparatus as defined in claim 16,
wherein said control means controls so as to, in response to enlargement or diminution of one of said first and second display sections in a predetermined scale ratio, enlarge or diminish the other of said display sections in a predetermined scale ratio.

20. The information processing apparatus as defined in claim 16,
wherein said control means controls so as to, in response to enlargement or diminution of one of said first and second display sections in a predetermined scale ratio, enlarge or diminish the other of said display sections in an arbitrarily specified scale ratio.

21. The information processing apparatus as defined in claim 16, further comprising
a specified color code memory section for storing the code corresponding to a specified color; and
a current scale ratio memory section for storing the current scale ratio for said first and second display sections,
wherein said control means controls so that said objects are displayed on said first and second display sections in the color stored in said specified color code memory section and/or in the scale ratio stored in said current scale ratio memory section in advance when the power is turned on and when a different mode is ended.

22. The information processing apparatus as defined in claim 16, wherein the plurality of objects are buildings.

23. An information processing apparatus, comprising:
a first display screen;
a second display screen;
an input section effecting user input for changing a display state of a selected object on at least one of the first display screen and the second display screen;
a controller communicating with the first and second display screens and the input section, the controller effecting display of a plurality of objects in a plan view on the first display screen and in a front view on the second display screen, said controller controlling a display state of the first and second display screens such that in response to a change in the display state of one of the first and second display screens, the controller changing the display state of the other of the first and second display screens, wherein the controller comprises a marking unit, and wherein in response to selection of the selected object of one of the plurality of objects on the first display screen or second display screen through the input section, the marking unit marks the selected object in the plan view of the first display screen, and at least the selected object and at least one adjacent object are included in the front view of the second display screen, thereby displaying a relative position of the selected object to the at least one adjacent object.

24. The information processing apparatus as defined in claim 23, wherein the controller effects display of the front view by centering the selected object.

25. The information processing apparatus as defined in claim 23, wherein if the user changes the selected object to another selected object on one of the first display screen and the second display screen via the input section, the controller changing the display by marking the another selected object on the plan view and by centering the another selected object on the front view.

26. The information processing apparatus as defined in claim 23, wherein the display state comprises at least one of a display color, a display scale ratio, and a display orientation.

27. The information processing apparatus as defined in claim 23, wherein the plurality of objects are buildings.

* * * * *